S. BORTON.
SEWING MACHINE.
APPLICATION FILED DEC. 13, 1906.

1,041,574.

Patented Oct. 15, 1912.
21 SHEETS—SHEET 1.

WITNESSES.
Gustave R. Thompson.
Ruth C. Fitzhugh.

INVENTOR.
Stockton Borton,
by
Mauro, Cameron, Lewis, Massie
Attorneys

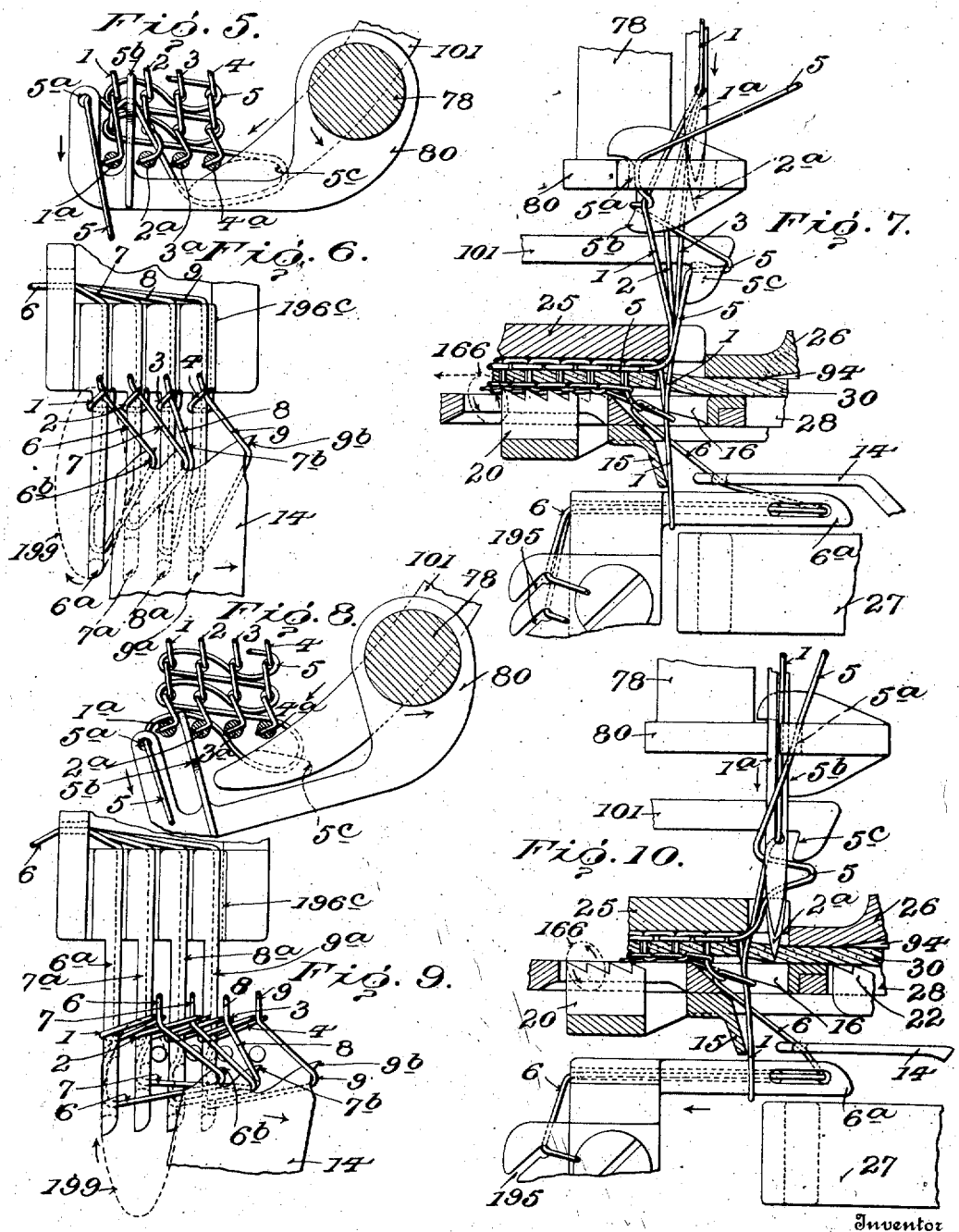

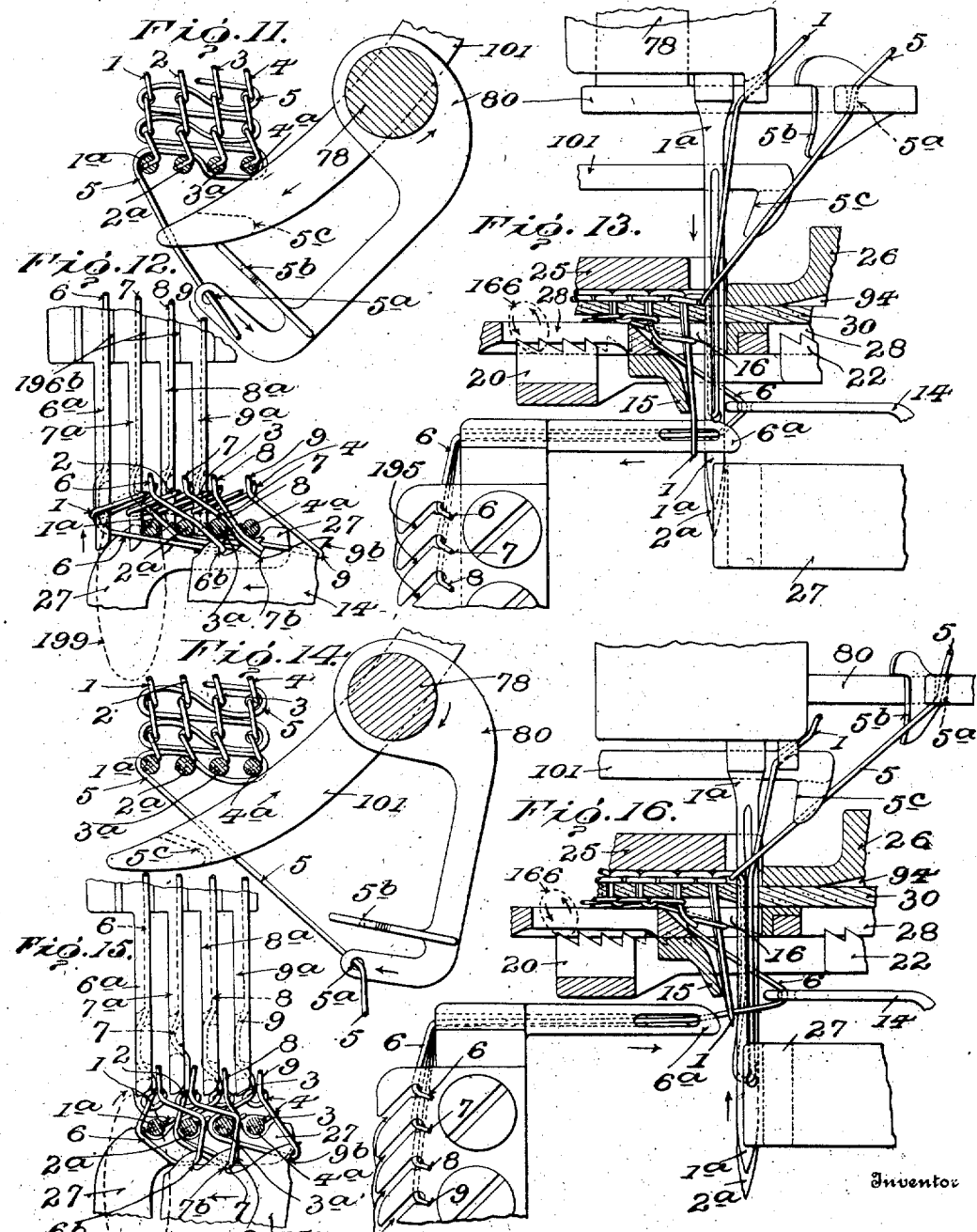

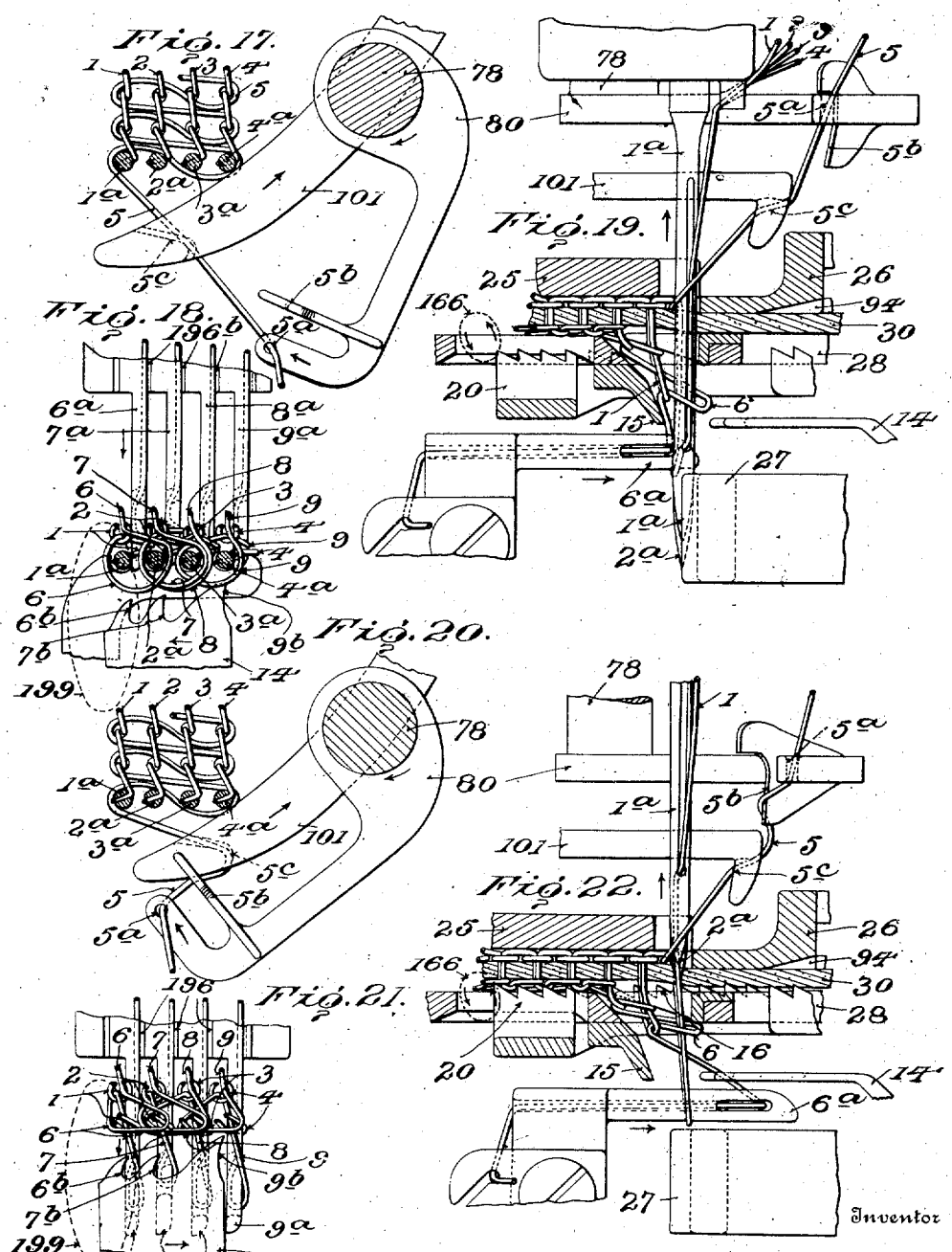

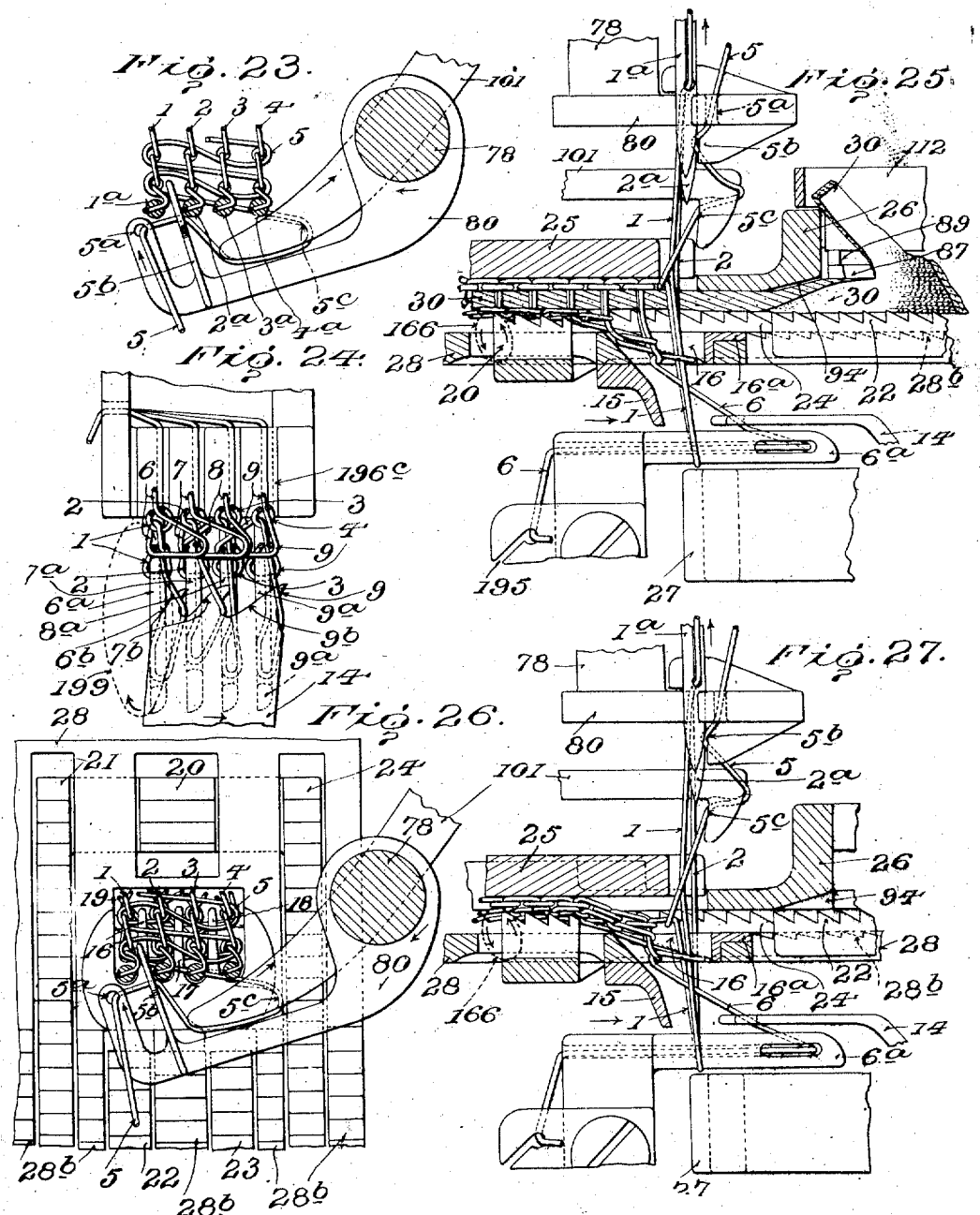

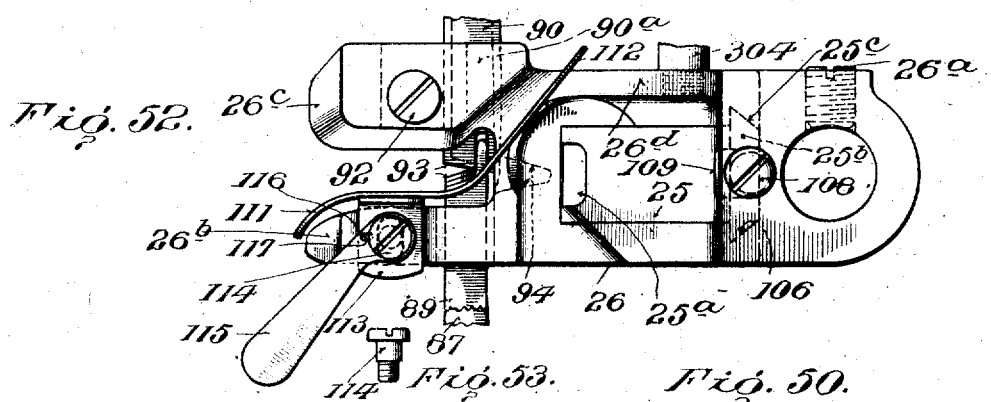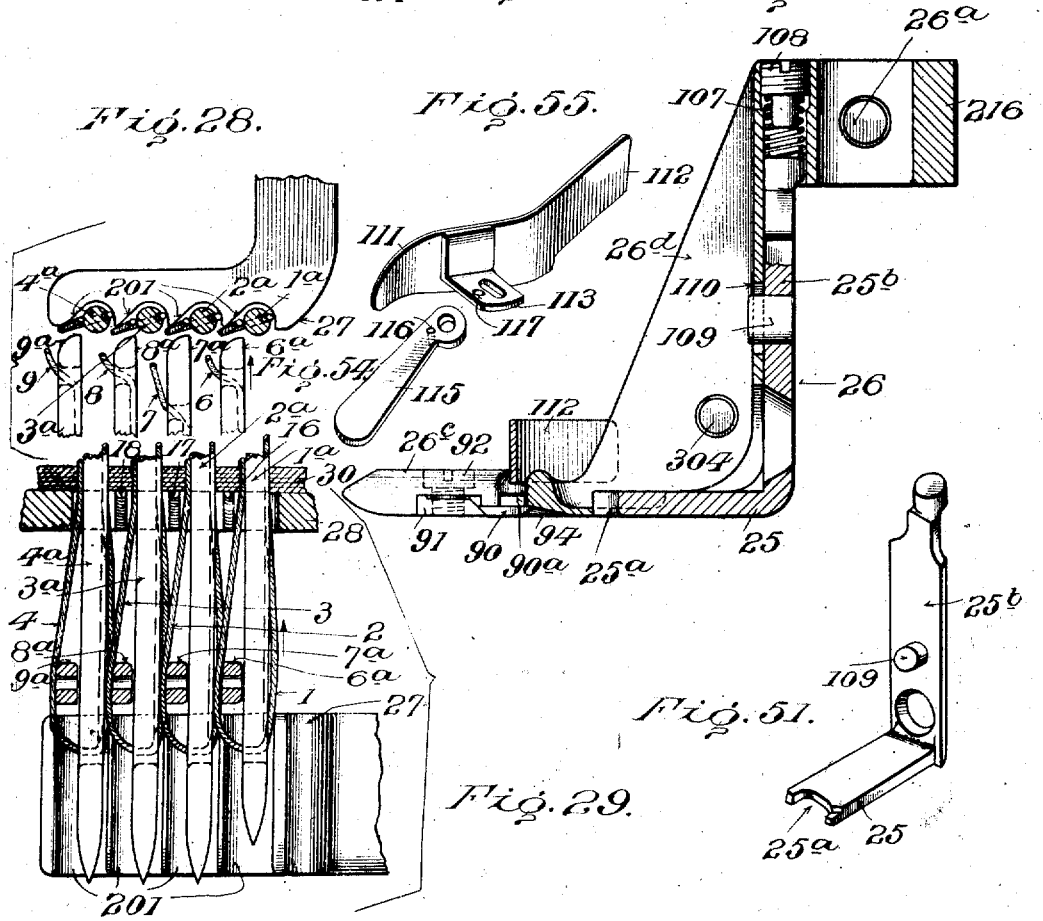

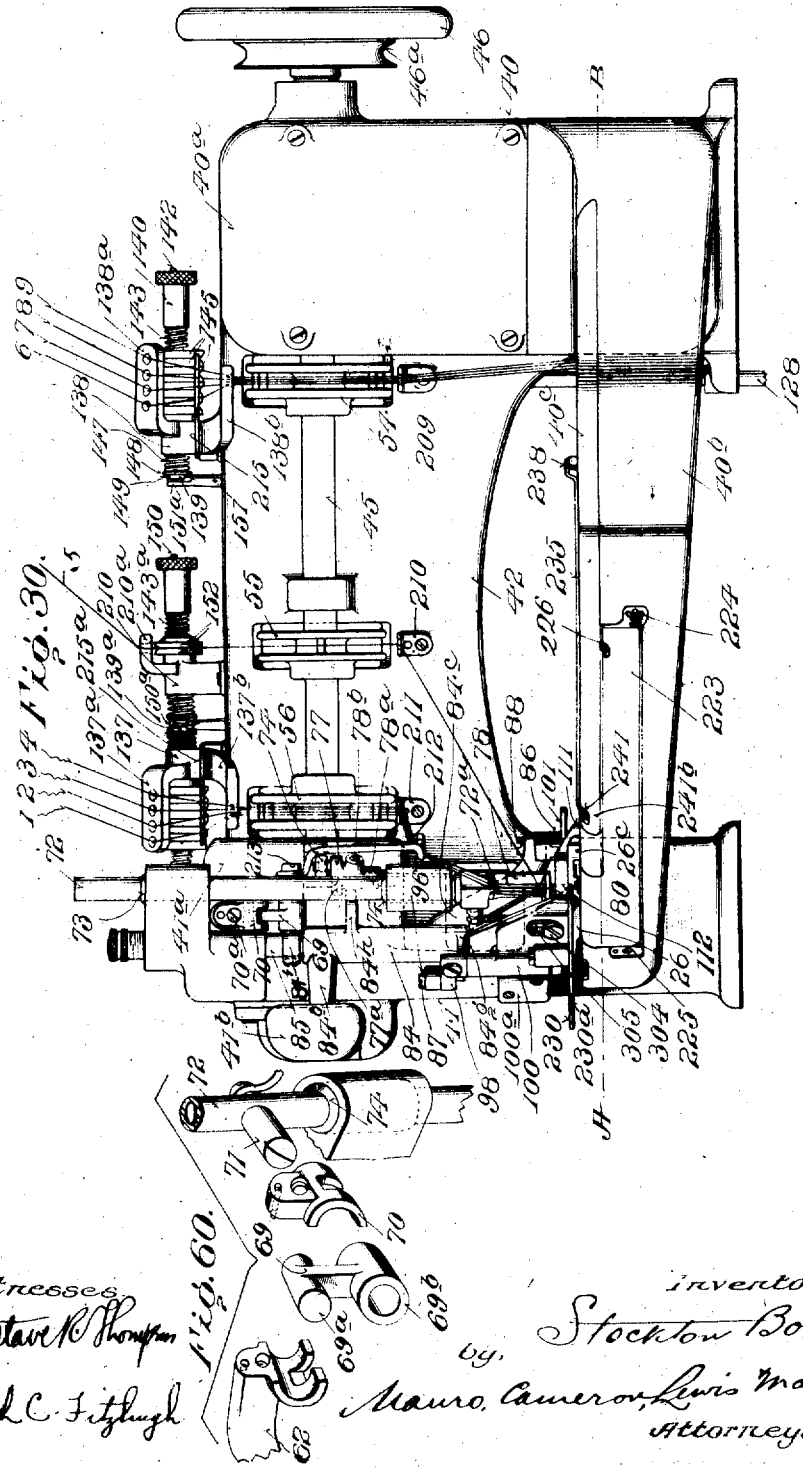

S. BORTON.
SEWING MACHINE.
APPLICATION FILED DEC. 13, 1906.

1,041,574.

Patented Oct. 15, 1912.
21 SHEETS—SHEET 8.

Witnesses.
Gustave R. Thompson
Ruth C. Fitzhugh

Inventor.
Stockton Borton
by
Mauro, Cameron, Lewis Massie
Attorneys.

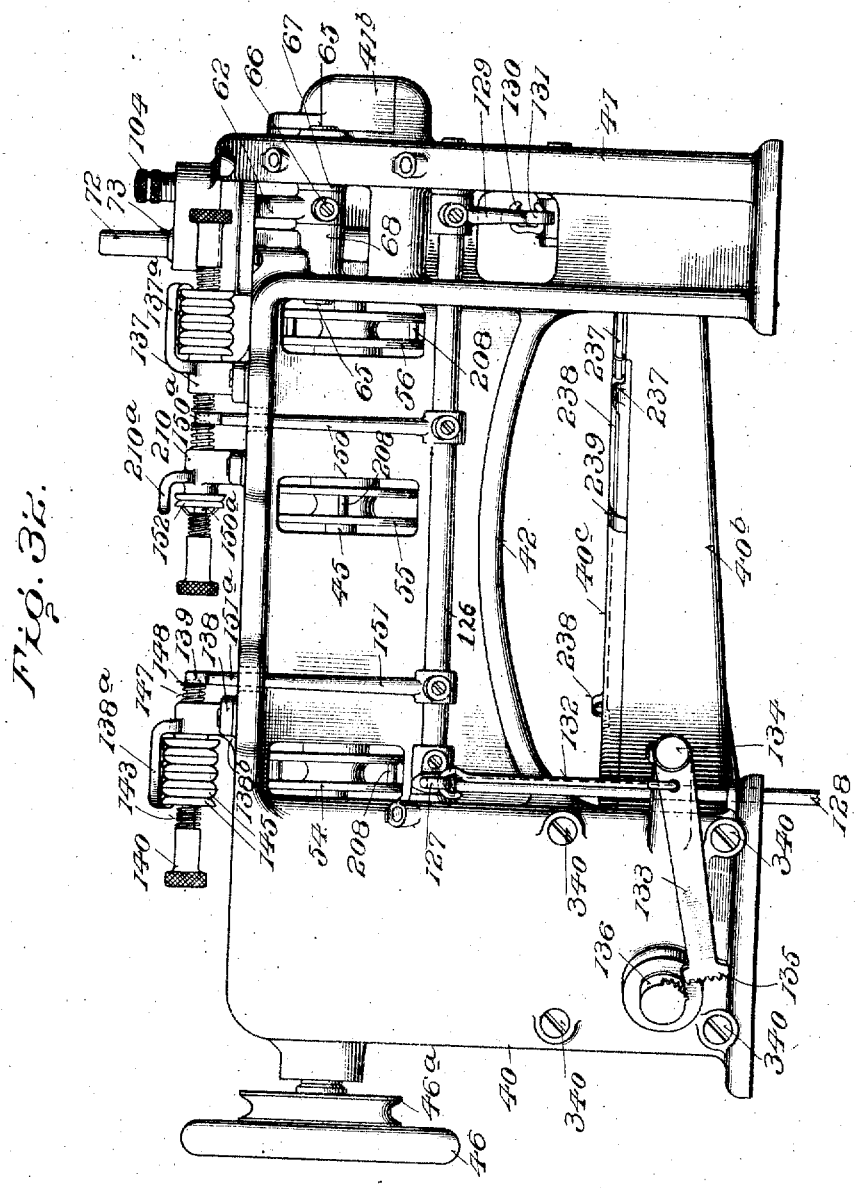

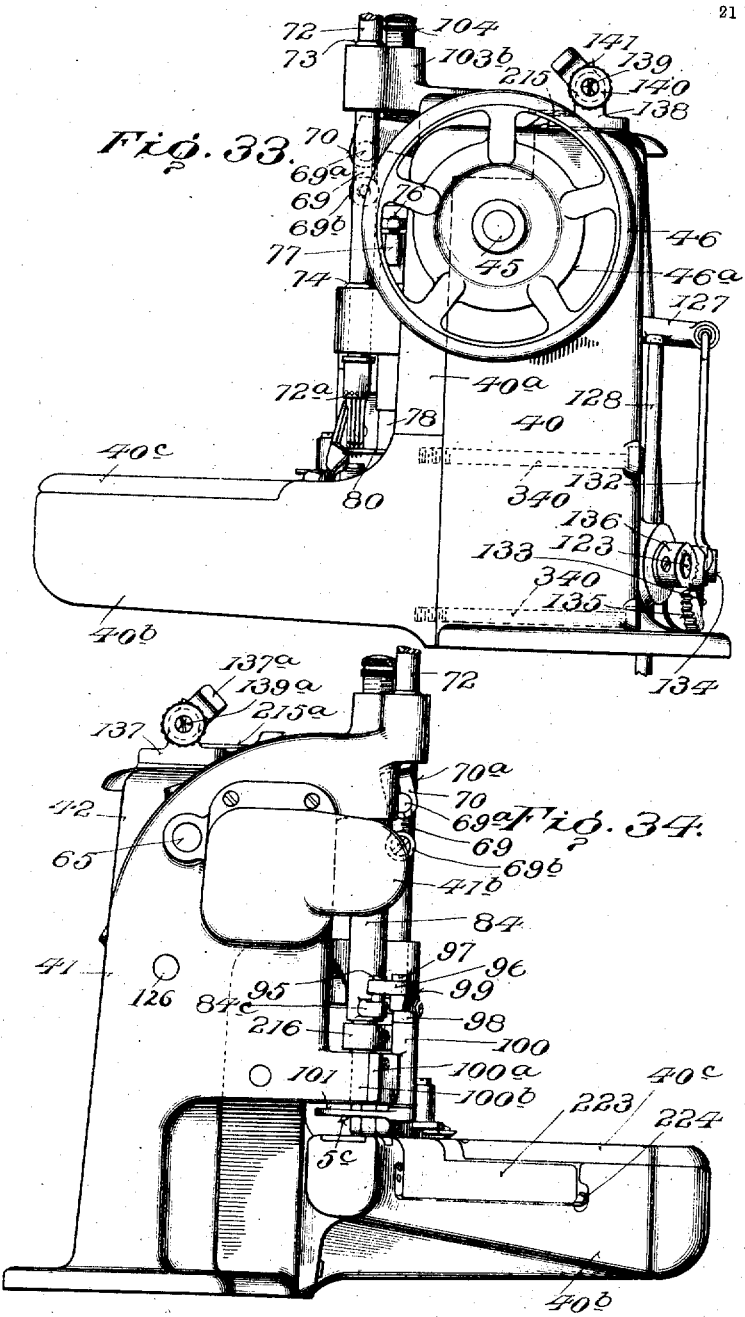

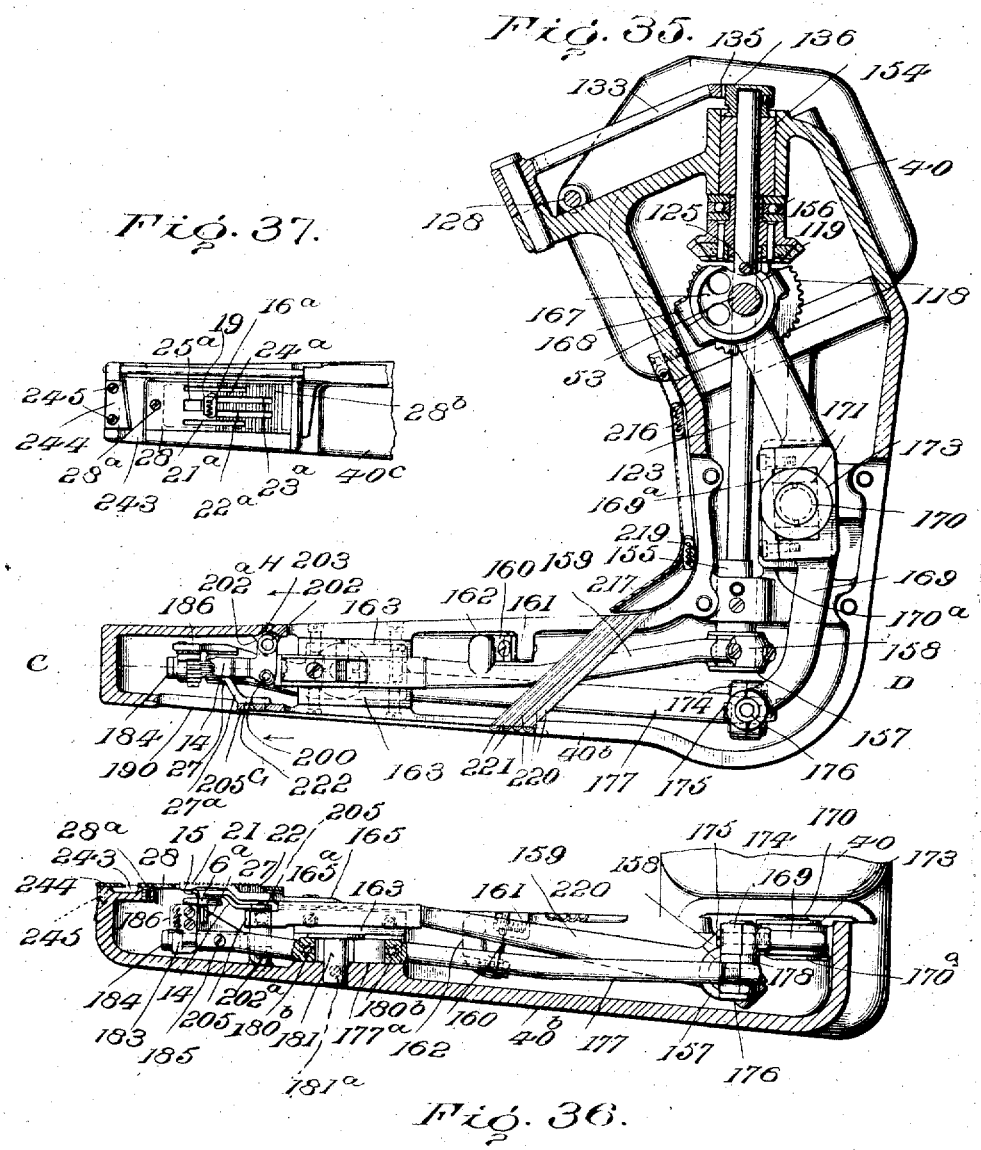

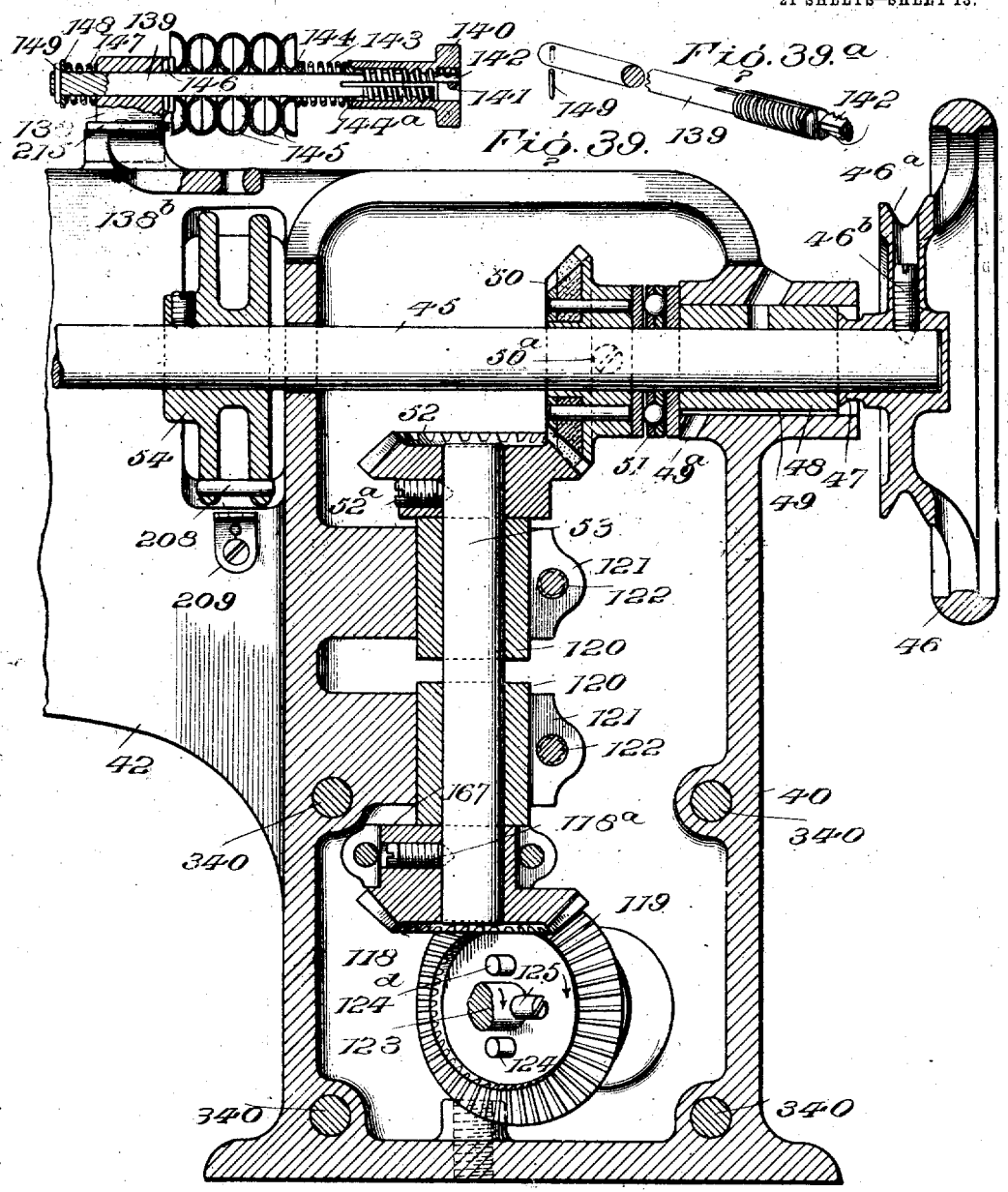

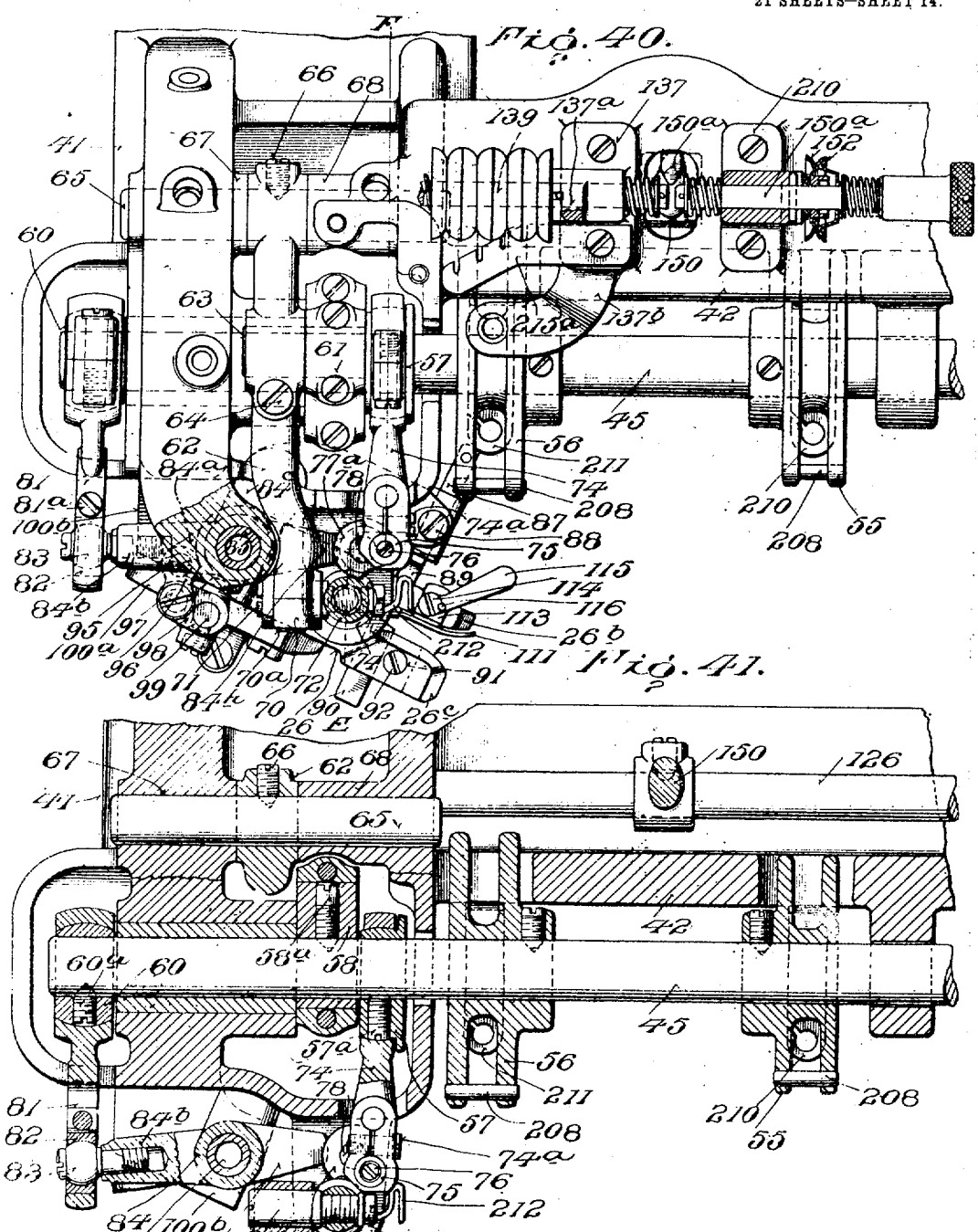

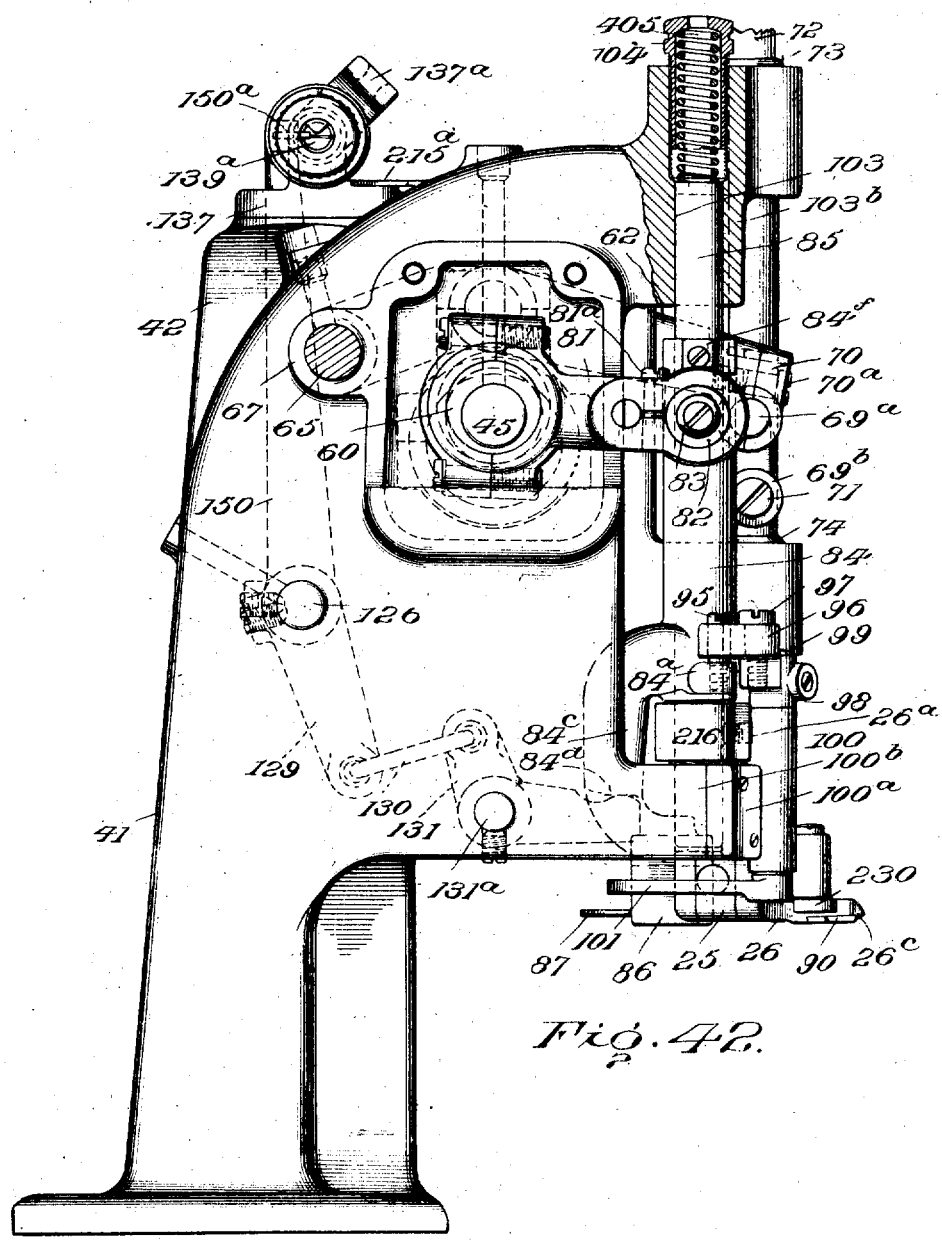

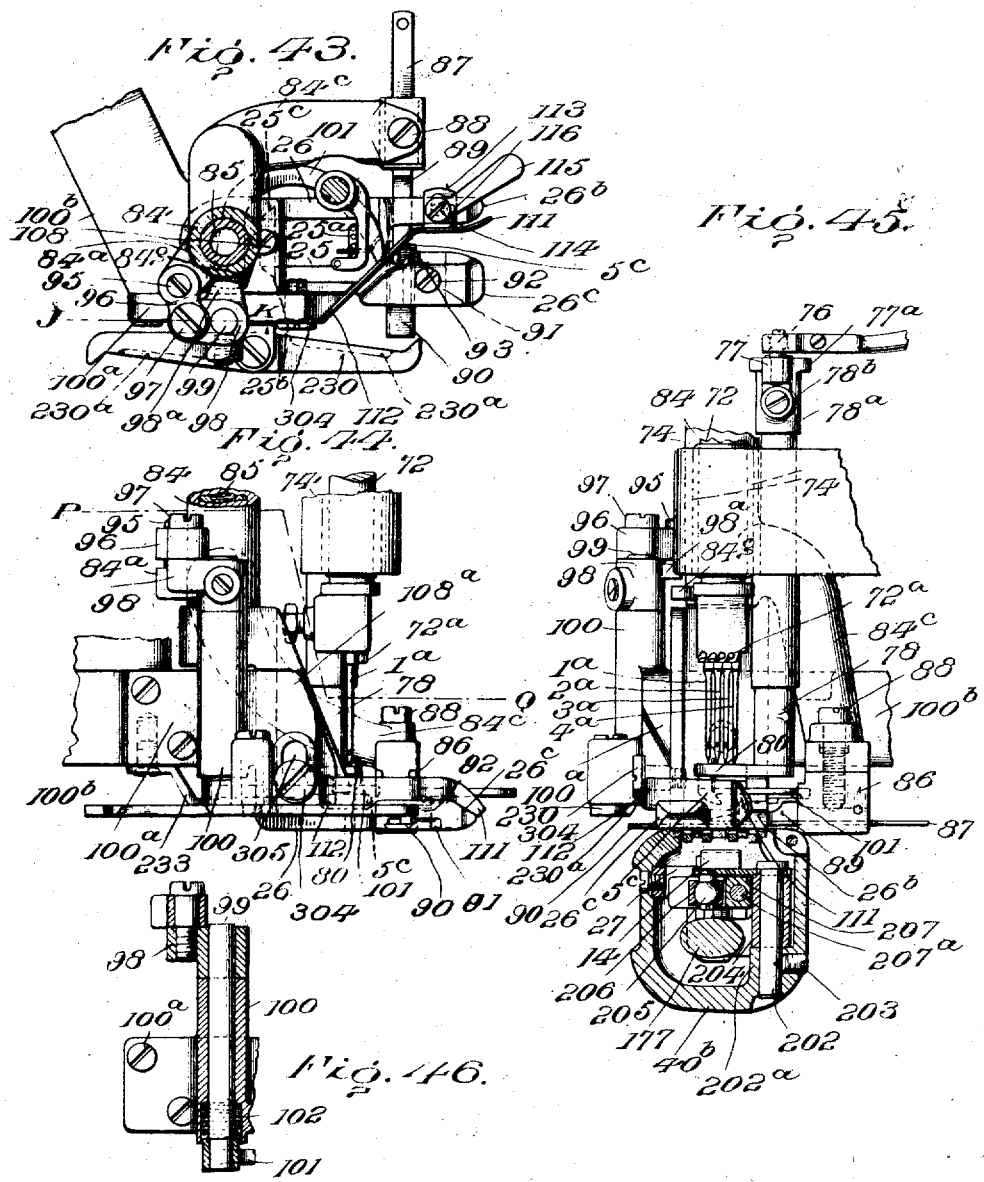

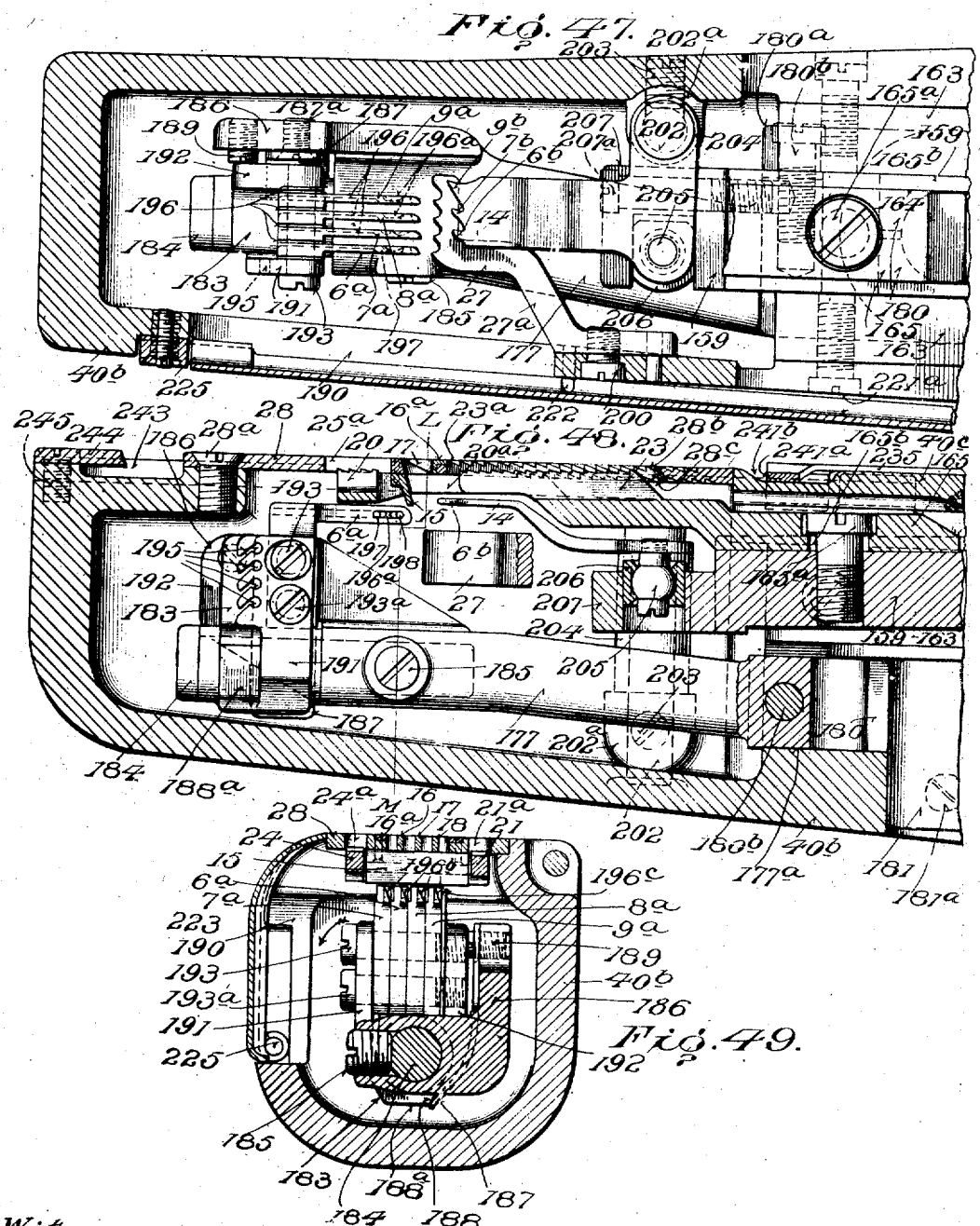

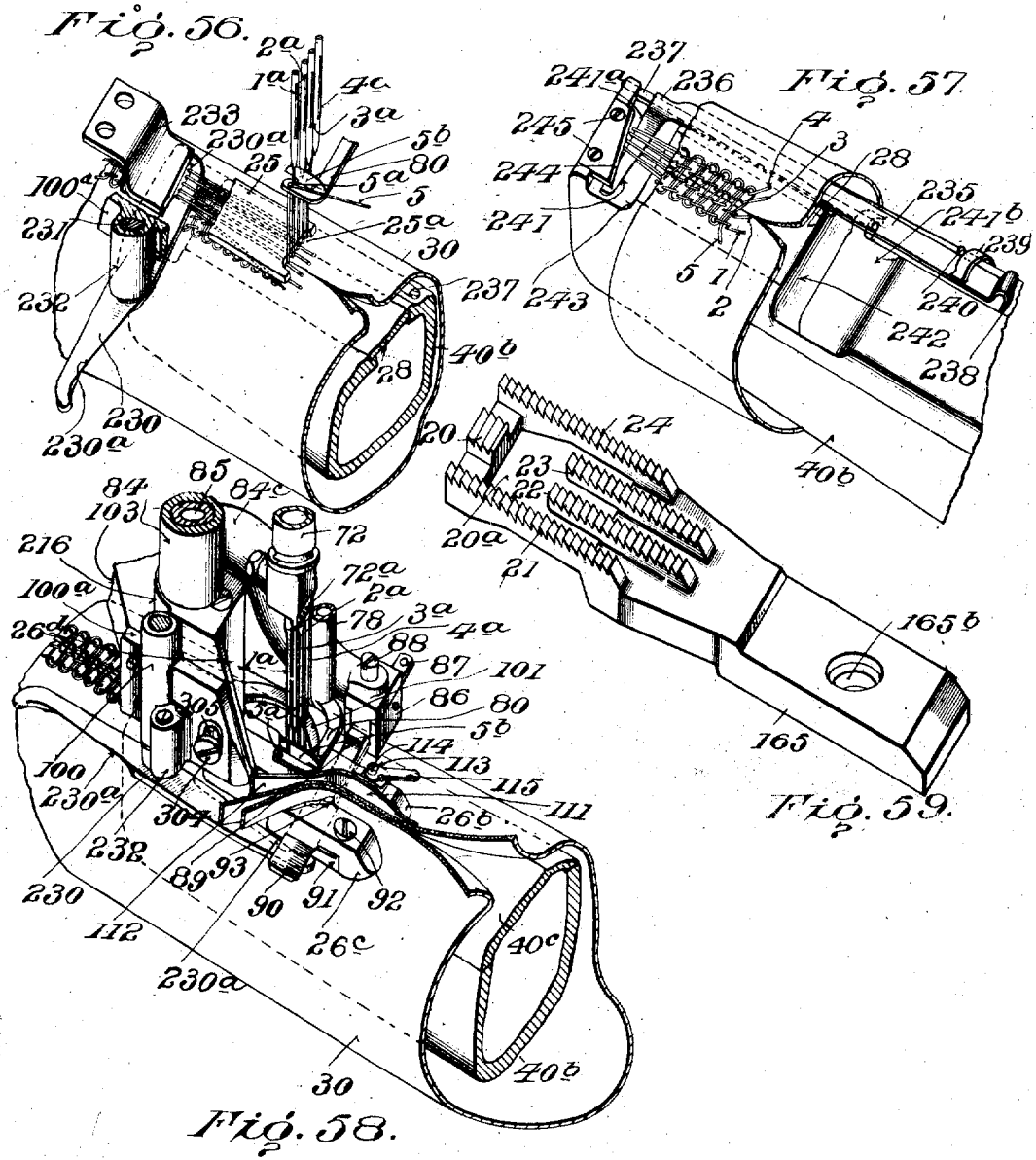

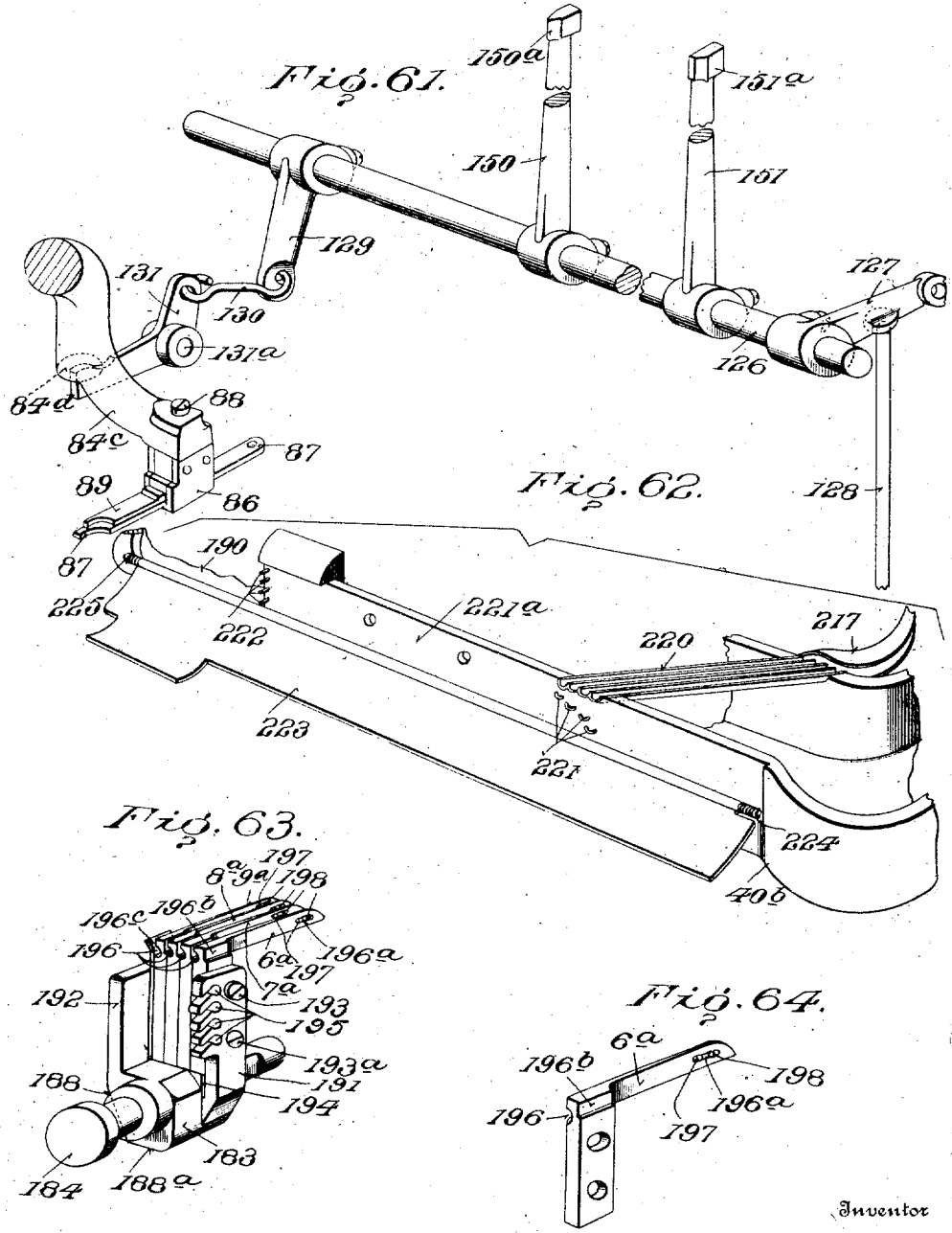

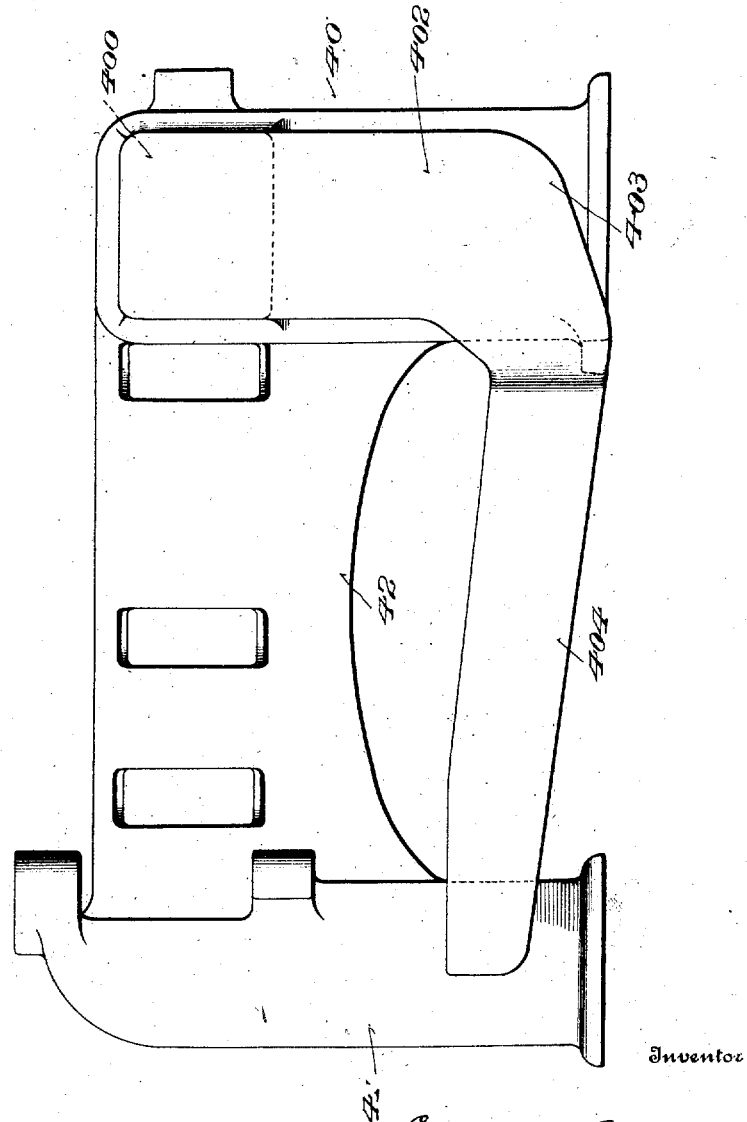

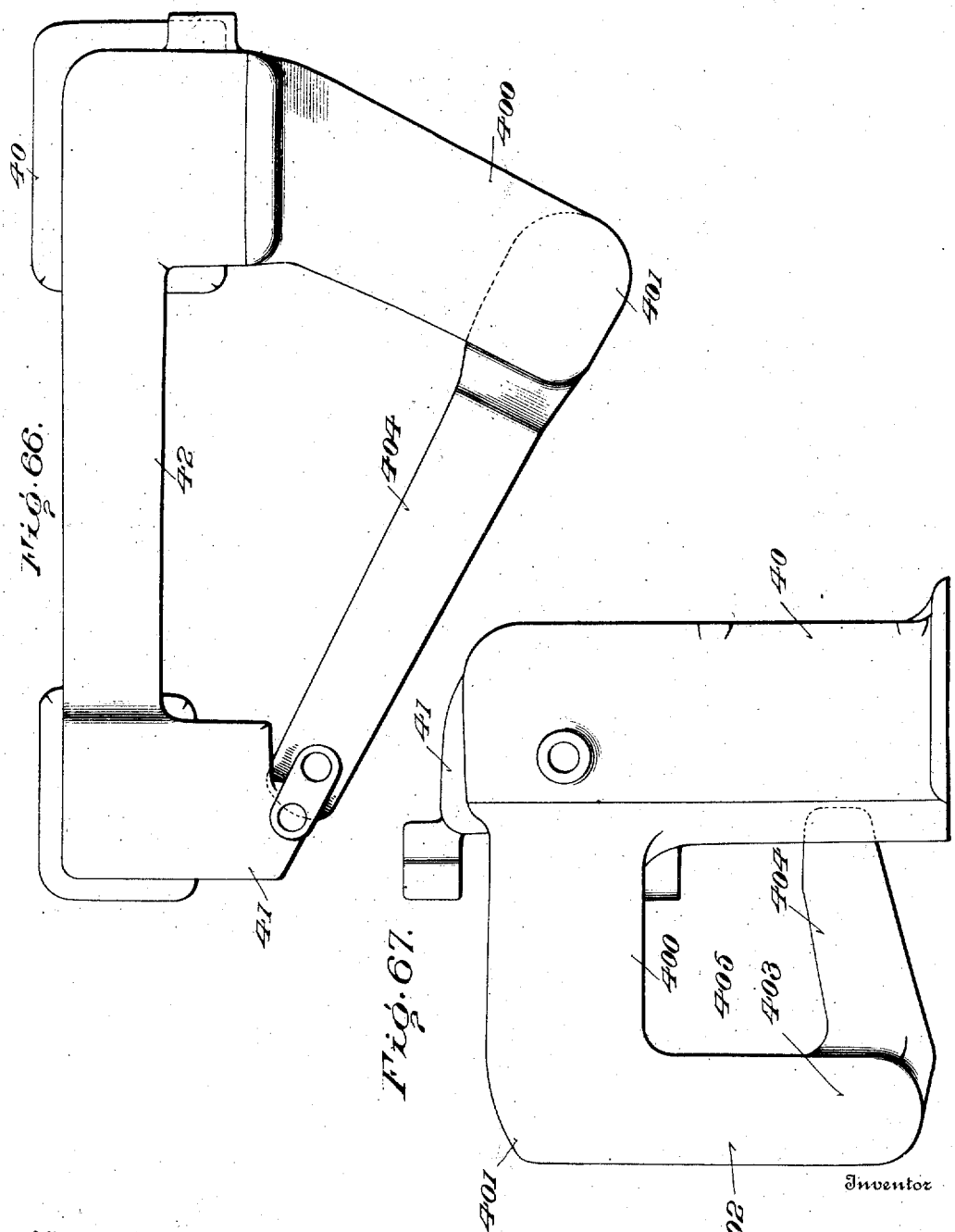

UNITED STATES PATENT OFFICE.

STOCKTON BORTON, OF PROVIDENCE, RHODE ISLAND, ASSIGNOR TO WILLCOX & GIBBS SEWING MACHINE COMPANY, OF NEW YORK, N. Y., A CORPORATION OF NEW YORK.

SEWING-MACHINE.

1,041,574. Specification of Letters Patent. Patented Oct. 15, 1912.

Application filed December 13, 1906. Serial No. 347,649.

*To all whom it may concern:*

Be it known that I, STOCKTON BORTON, of Providence, Rhode Island, have invented a new and useful Improvement in Sewing-Machines, which invention is fully set forth in the following specification.

The present invention relates to a sewing-machine especially designed to produce, by one operation and at high speed (meaning that each needle shall be capable of making approximately three thousand or more stitches per minute), a complete seam of special form for joining two abutting edges of cut knit-goods. The various features of improvement, and novel combinations of coöperating elements, many or all of which may be applied with advantage to sewing machines designed for other classes of work and to produce different seams, are fully explained in conjunction with the accompanying drawings illustrating what is at present believed to be the preferred embodiment of the invention.

Figure 1:
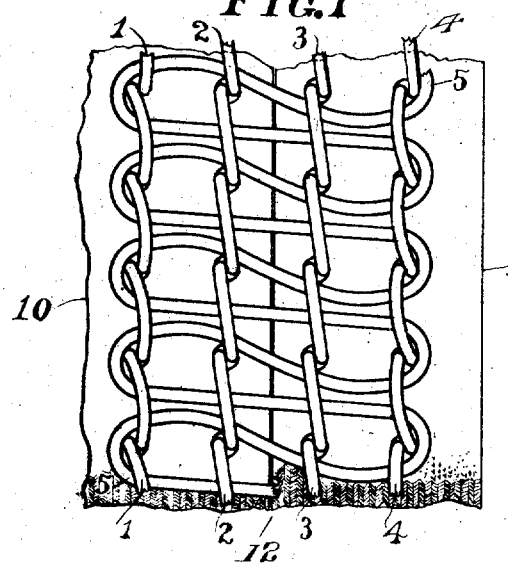
Figure 2:
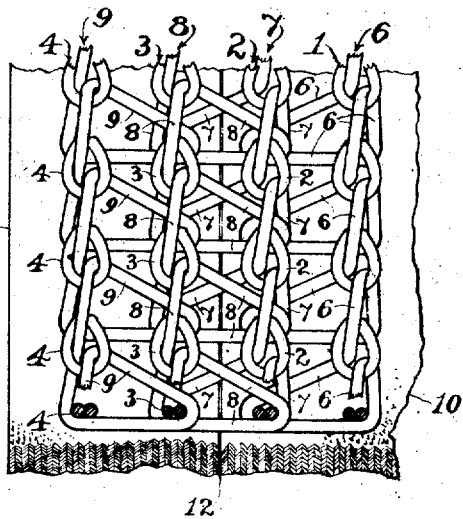
Figure 3:
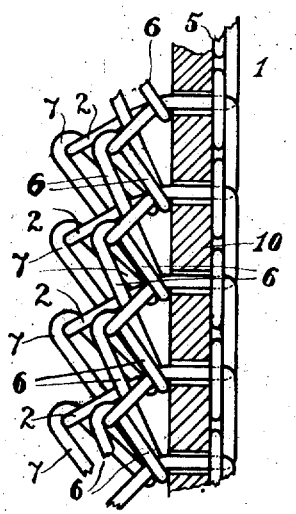
Figure 4:
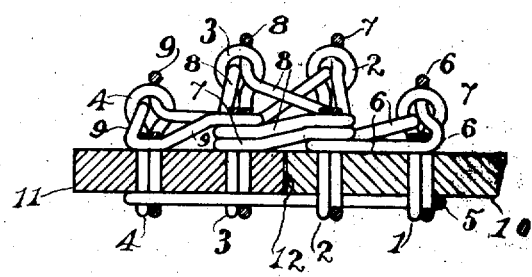
Figure 38:
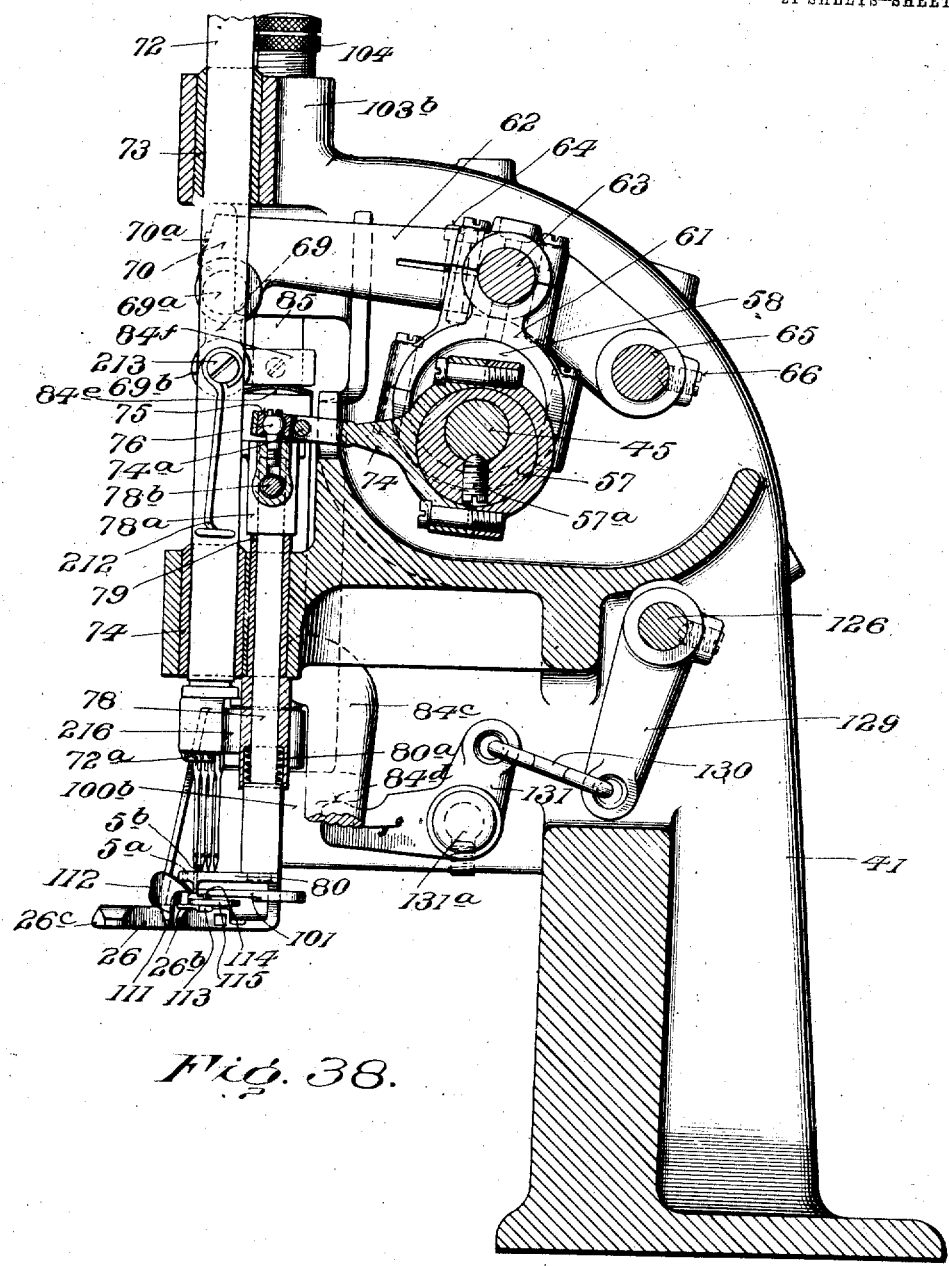

Figures 1, 2, 3 and 4 (Sheet 1) illustrate on an enlarged scale the seam formed by the machine shown, Fig. 1 being a plan view from above the work in the position it leaves the stitch-forming mechanism; as the needles operate from above the work, this side of the seam will be referred to hereafter as the "needle-side;" Fig. 2 is a plan view from below the work in the position it leaves the stitch-forming mechanism; or in other words a plan view of the opposite side of the seam from that shown in Fig. 1. As the chains of the chain-stitches appear on this side of the seam, it will be referred to hereafter as the "chain-side;" Fig. 3 is an edge view from the right of Fig. 2, with the fabric shown in section; Fig. 4 is an edge view from the bottom of Fig. 2 with the fabric shown in section; Figs. 5 to 25 (Sheets 2 to 5) include seven groups of views, the respective groups illustrating (on an enlarged scale) successive positions of the stitch-forming elements, the directions of movement of the moving elements being indicated by arrows. The first group of these views embraces Figs. 5, 6 and 7 showing the stitch-forming elements in their relative positions when the needles are at the limit of their upward movement, and the loopers below the throat-plate at the limit of their advance or forward movement in relation to the needles; Fig. 7 being a vertical sectional view through the throat-plate and the work, with the stitch-forming elements above and below the work-plate in elevation; Fig. 5 being a corresponding plan view (turned at right-angles to Fig. 7) of the elements above the throat-plate; and Fig. 6 being a corresponding plan view (turned at right-angles to Fig. 7) of the elements below the throat-plate. The direction of feed of the work (which is advancing at this time) is indicated by arrow in dotted lines, Fig. 7. The second group of views embraces Figs. 8, 9 and 10 (similar to Figs. 5, 6 and 7 respectively), showing the elements in their relative positions at the instant the needles (having descended from the positions shown in Fig. 7) are just entering the work. The third group of views embraces Figs. 11, 12 and 13 (similar to Figs. 5, 6 and 7 respectively) showing the elements in their relative positions at the instant the eyes of the descending needles reach the level of the upper edges of the loopers. The fourth group of views embraces Figs. 14, 15 and 16 (similar to Figs. 5, 6 and 7 respectively) showing the elements in their relative positions at the instant that the needles, having passed the limit of their descending movement, have just commenced to ascend, and the loopers having passed the limit of their backward or receding movement are just beginning to again advance toward the needles. The fifth group of views embraces Figs. 17, 18 and 19 (similar to Figs. 5, 6 and 7 respectively) showing the elements in their relative positions just after the points of the loopers have entered loops of the needle-threads. The sixth group of views embraces Figs. 20, 21 and 22 (similar to Figs. 5, 6 and 7 respectively) showing the elements in their respective positions at the instant the points of the ascending needles are leaving the work. The seventh group of views embraces Figs. 23, 24 and 25 (similar to Figs. 5, 6 and 7 respectively) showing the elements in their respective positions at the instant the feed-surface, in feeding the work, reaches the highest point in its travel. Fig. 25 shows parts of the trimmer-mechanism not shown in previous views. Fig. 26 (Sheet 5) is a top plan view, at right-angles to Fig. 27, of the parts shown in Fig. 27. Fig. 27 (Sheet 5) is a view similar to Fig. 25, illustrating the operation of the stitch-forming elements in "chaining-off," this expression referring to the formation of the threads into stitches in the absence of any fabric to be operated upon, as for example in passing from one garment to another. Fig. 28 (Sheet 6) is a top view showing the loop-check, the needles (in horizontal section); the needle-threads and the points of the loopers in their relative positions at the instant they are about to enter the needle-loops. Fig. 29 (Sheet 6) is an elevation looking from below Fig. 28 the loopers being shown in section through their eyes, and the throat-plate and work being also shown in section. Fig. 30 (Sheet 7) is a front elevation, Fig. 31 (Sheet 8) a plan view, and Fig. 32 (Sheet 9) a rear elevation of the complete machine. Fig. 33 (Sheet 10) is an end elevation from the right of Figs. 30 and 31. Fig. 34 (Sheet 10) is an end elevation from the left of Figs. 30 and 31. Fig. 35 (Sheet 11) is a horizontal section on line A—B, Fig. 30 (Sheet 7). Fig. 36 (Sheet 11) is a vertical section on line C—D, of Fig. 35. Fig. 37 (Sheet 11) is a plan view of the end of the work arm. Fig. 38 (Sheet 12) is a vertical section with the work-arm omitted, on the line E—F, Figs. 31 (Sheet 8) and 40 (Sheet 14). Fig. 39 (Sheet 13) is a vertical section on the line N—O, Fig. 31. Fig. 39ª (Sheet 13) is a detail perspective of a bar forming part of one of the tension devices. Fig. 40 (Sheet 14) is a top plan view of the left-hand end of the machine, with the work-arm omitted and casing caps removed. Fig. 41 (Sheet 14) is a horizontal section through the part of the machine shown in Fig. 40. Fig. 42 (Sheet 15) is a full-size end view of the machine looking from the left of Fig. 31 (Sheet 8), the work-arm and part of the casing not being shown, as will appear by comparison with Fig. 34 (Sheet 10). Fig. 43 (Sheet 16) is a horizontal section on line P—Q, of Fig. 44, and Fig. 44 (Sheet 16) is an elevation from below Fig. 43, of the presser-foot and associated parts above the throat-plate. Fig. 45 (Sheet 16) is a vertical sectional view and elevation on line G—H, Figs. 31 (Sheet 8) and 36 (Sheet 11) looking in the direction of the arrows. Fig. 46 (Sheet 16) is a vertical detail section on line J—K of Fig. 43. Fig. 47 (Sheet 17) is an enlarged horizontal sectional view through the end of work-arm showing the operating parts within in elevation. Fig. 48 (Sheet 17) is a vertical sectional view through the parts shown in Fig. 47. Fig. 49 (Sheet 17) is a transverse section on line L—M of Fig. 48. Fig. 50 (Sheet 6) is a vertical sectional view, and Fig. 52 (Sheet 6) is a top plan view of the presser-foot. Figs. 51, 53, 54 and 55 (Sheet 6) are detail views of parts of the presser-foot. Fig. 56 (Sheet 18) is a perspective view of part of the machine, at the end of and above the work-arm, illustrating the operation of the upper thread-cutter when it is necessary to remove the work where the seam cannot be run off the outer edge of work. Fig. 57 (Sheet 18) is a perspective view of end of work-arm illustrating operation of cutter for looper-threads when it is necessary to remove the work where the seam cannot be run off the outer edge of work. Fig. 58 (Sheet 18) is a perspective view of part of the machine, at the end of and above the work-arm, illustrating particularly the operation of trimming the edges to be joined by the seam. Fig. 59 (Sheet 18) is an enlarged perspective view of the feed-surface. Fig. 60 (Sheet 7) shows in perspective parts of the driving connection to the needle-bar. Fig. 61 (Sheet 19) shows in perspective a part of the connections for lifting parts of the mechanism which operate above the throat-plate. Fig. 62 (Sheet 19) is a perspective view of a part of the work arm with portions broken away. Fig. 63 (Sheet 19) is a perspective view of the loopers and their carrier or block. Fig. 64 (Sheet 19) is a perspective view of a single looper. Figs. 65, 66 and 67 are views in outline of a modified form of machine frame in which the shape of the work-arm differs somewhat from that shown in the other figures,—Fig. 65 (Sheet 20) being a front elevation, Fig. 66 (Sheet 21), a top plan view on a smaller scale, and Fig. 67 (Sheet 21) an end view from the right of Fig. 66.

*The seam.*—The seam formed by the machine of this invention, and shown in Figs. 1–4, is the subject-matter of United States Patent No. 883,614, dated March 31st, 1908, to Stockton Borton. This seam is capable of being formed by a single operation of the machine and is particularly designed for joining together the edges of cut knit-goods, though it may also be employed to advantage with other kinds of fabrics and for ornamental and other purposes. Such seam, as formed by this machine, will securely join two abutting or meeting edges of cut knit-goods and hold down, cover and secure the thread ends of rough raw edges, preventing said thread ends from sticking up and marring the smoothness and finish of the seam, which is neat, compact and attractive in both design and appearance.

Detailed explanation of the seam will assist an understanding of the machine by which it is formed. Fig. 1 shows the side formed by the parts of the mechanism operating above the throat-plate and may for convenience be designated the "needle side" of the seam. Fig. 2 shows the side formed by the parts of the mechanism operating below the work-plate and may for like reason be designated the "chain side" of the seam. In Figs. 1–4, 10 and 11 are two pieces of fabric, such for example as cut knit-goods, the opposing or abutting edges of which are first trimmed by the trimmer-mechanism of the machine (explained hereafter) and brought together along the line 12, which may be regarded as the medial line of the seam. The seam is formed of nine threads, namely, the four needle-threads 1, 2, 3 and 4 on the needle-side, loops of these threads being carried through the goods to the chain-side; a cross-thread 5 on the needle-side; and finally four hook or looper-threads 6, 7, 8 and 9 on the chain-side. The needle-threads 1, 2, 3 and 4 with their corresponding looper-threads 6, 7, 8 and 9 form four parallel or approximately parallel rows of stitches, two rows on either side of the meeting line 12 of the two edges being joined. On the needle-side, Fig. 1, the cross-thread 5, in running to the right, always passes beneath four stitches of the four parallel lines of stitches, all of said four stitches being in transverse alinement; in returning said cross-thread passes beneath the next succeeding stitch in each of the two parallel lines of stitches in the fabric 11, but beneath the same stitches in fabric 10. It follows that at the outer edges of the needle-side of the seam the cross-thread 5 forms a succession of loops each passing through two adjacent stitches and connecting each end of every stitch to the end of an adjacent stitch. On the chain side, the looper-thread 9, after passing through a loop in needle-thread 4, passes around the shank of the next succeeding loop in thread 4, then to the right around the shank of a loop in needle-thread 3, thence backward and upward passing again through the first mentioned loop in needle-thread 4, and so on. In a similar manner, the looper-thread 8, after passing through a loop in needle-thread 3, passes around the shank of the next succeeding loop in thread 3, then to the right around the shank of a loop in needle-thread 2, thence backward and upward again through the loop in thread 3 through which it first passed, and so on. The looper-thread 6, after passing through a loop in needle-thread 1, is carried to the left around the shank of a loop in needle-thread 2, thence around the shank of the next loop in needle-thread 1, thence backward and upward again through the loop in thread 1 through which it first passed—and so on. Likewise the looper-thread 7, after passing through a loop in needle-thread 2, is carried to the left around the shank of a loop in needle-thread 3, thence around the shank of the next loop in needle-thread 2, thence backward and upward again through the loop in thread 2 through which it first passed—and so on. As shown in Fig. 4, of the three looper-threads around the shank of the loop in needle-thread 3, the loop in looper-thread 7 lies next to the fabric, with the loop in looper-thread 8 between it and the loop in looper-thread 9; and of the three looper-thread loops around the shank of the loop in the needle-thread 2, the loop in looper-thread 6 lies next to the fabric, with the loop in looper-thread 7 between it and the loop in looper-thread 8. These loops may assume this or any other relative arrangement according to the manner of operation of the mechanism used in the formation thereof.

In the seam formed as explained above, the two inside parallel lines of stitches may, without danger of being pulled out, be placed very near the abutting edges of the two pieces of goods 10 and 11, as the outer parallel rows of stitches take a relatively wide hold on the goods and are principally relied upon to resist transverse strain or pull tending to separate the joined edges. The cross-thread 5 on one side and the crossing of the looper-threads on the other side securely binds together the four parallel rows of stitches and therefore distributes and equalizes all strain or pull tending to separate the connected edges. Furthermore, the disposition of the threads, and particularly the crossing of the looper-threads, gives advantageous elasticity to the seam. The crossing of both looper-threads 7 and 8 across the line of abutment 12 for each stitch, affords a double covering of crossing threads at the middle of the seam where they are most needed to catch, hold down and confine projecting thread ends when the seam is employed to connect two edges of the cut knit-goods. At the outer edges of the seam only one of the looper-threads (6 or 9) is crossed between the parallel rows of stitches, thus making the seam light and thin at these portions. The cross-thread 5 and the crossing portions of the looper-threads are bound down by the needle-threads against the surface of the goods.

The same reference numerals are applied to the nine threads where they appear in other figures of the drawings.

*Movements of thread-handling elements.*— Referring to the seven groups of views, Figs. 5 to 25, the movements of the parts which carry and act directly upon the nine threads will next be explained. Such explanation will assist an understanding of the driving connections and other mechanism by which said movements are imparted to these parts. In the several views, the directions of movement of the moving parts are, as before stated, indicated by arrows. $1^a$, $2^a$, $3^a$ and $4^a$ are a gang of four parallel needles for the needle-threads 1, 2, 3 and 4 respectively; these needles are secured to a common needle-bar and reciprocate together, the needle $1^a$ being slightly shorter than the others, as shown, and for reasons explained hereafter. In addition to the four needles, the thread-carrier 80 and the hook 101 for the upper cross-thread operate above the throat-plate. The thread-carrier 80 is fixed to the lower end of an oscillatory shaft 78, and has a thread-eye $5^a$ and a projecting thread-guiding blade $5^b$. Hook 101 is formed at its end with a depending horn $5^c$. A part of the presser-foot is shown at 26, and a part of an auxiliary foot, yieldingly carried by the presser-foot and designated a "chaining-foot", is shown at 25. 28 is the cloth or throat-plate and 30 is a piece of fabric on which the mechanism is operating.

*Elements above throat-plate.*—The movements and successive positions of the needles, thread-carrier 80 and hook 101 (parts operating above the throat-plate 28) in forming the upper side of the seam, will now be explained.

Referring first to the position of the parts shown in Figs. 5, 6 and 7, the four needle-threads 1, 2, 3 and 4 extend downward through the eyes of needles $1^a$, $2^a$, $3^a$ and $4^a$, through the work 30, in loops around the four loopers $6^a$, $7^a$, $8^a$, $9^a$, respectively, and up through the fabric to the preceding stitches formed by the needles respectively. The cross-thread 5 extends downward through eye $5^a$ of thread-carrier 80, partly around the needle-thread 1, which it deflects toward the rear (or in the direction of the feed) as clearly shown in Fig. 7, across the edge of blade $5^b$, thence around the horn $5^c$ of hook 101 through openings in the main presser-foot 26 and the auxiliary presser-foot 25 to the work at a point where it is bound thereto by the stitch last formed in needle-thread 1. In Figs. 5-7 the parts are in movement in the directions indicated by the arrows; upon reaching the positions shown in Figs. 8-10, the horn $5^c$ of hook 101 has released the loop in thread 5, the needles $3^a$ and $4^a$ have passed through this loop into the work 30, the needle $2^a$ has entered the work in front of thread 5 (which extends between said needle and needle $3^a$), and shorter needle $1^a$ is about to enter the work also in front of thread 5. Still farther movement in the directions of the arrows, Figs 5-10, brings the parts to the positions shown in Figs. 11-13 (Sheet 3), and then to the positions shown in Figs. 14-16, the stitches which the needles form over the cross-thread having drawn part of cross-thread 5 down through the openings in the presser-feet and secured it to the work; the free portion of said thread extends upward from its point of attachment to the work, through the presser-feet and around needle $1^a$ to eye $5^a$ of thread-carrier 80 (see Fig. 14), and forms about said needle at the left-hand side of the seam a partly completed loop. As indicated by the arrows in Figs. 14-16, the directions of movement of the parts have reversed, the thread-carrier 80 and hook 101 coöperating in this reverse movement to draw the thread 5 straight across the seam in front of the four needles and the needle-threads to complete the loop at the left-hand edge of the seam and also to form in said thread 5 another loop at the right-hand edge of the seam—see particularly the successive positions of these parts shown in Figs. 14, 17, 20 and 23. In Fig. 23 (Sheet 5) the parts have again nearly reached the positions shown in Fig. 5. The result of these operations is that for each complete movement of the needles two loops are formed in thread 5 at opposite edges of the seam, the needles $4^a$ and $3^a$ passing through one of said loops to the work and the needles $1^a$ and $2^a$ simultaneously passing through the other loop.

*Elements below throat-plate.*—The movements and successive positions of the elements which coöperate below the throat-plate in forming the chain-side of the seam will now be explained.

In Figs. 5-25, 20 represents a portion of the feed surface operating upward through the throat-plate to advance the work, its movement being illustrated by the ellipse 166 in dotted lines. $6^a$, $7^a$, $8^a$ and $9^a$ are loopers secured together and moving in unison. The dotted line ellipse 199 (Figs. 6, 9, 12, 15, 18, 21 and 24) illustrates the path described by looper $6^a$ in its movement. 14 is an oscillatory loop-spreader having thread engaging hook-points or teeth $6^b$, $7^b$, $9^b$. 15 is a loop-shedder acting to prevent movement of the loops in the needle-threads as the loopers are withdrawn from said loops. 27 is a loop-check and needle-guide, more fully explained later, acting to check one side and hold open the other side of loops in the needle-threads so that the loopers may readily enter said loops; and also acting to guide the points of the needles in case the latter have been deflected in their passage through the work.

It will conduce to lucidity to separately follow the looper-threads 6, 7, 8 and 9 in the different positions thereof in the several views 5 to 25.

*Looper-thread 6.*—This thread, as shown in Figs. 6 and 7, passes through a guide opening 195, thence in a groove along the side of looper $6^a$, through two eyes in the looper, thence around hook-point or tooth $6^b$ of spreader 14, thence upward through a loop in needle-thread 1 (which loop is being held by looper $6^a$) to the work. Movement of the parts in the directions of the arrows, Figs. 6 and 9, spreads the loop in looper-thread 6 thus projected through the loop in needle-thread 1, until the needles $1^a$ and $2^a$ have passed into said loop in thread 6, as shown in Figs. 12 and 13. In Figs. 15 and 16 the looper 6ᵃ has just shed (with the assistance of shedder 15) its loop in needle-thread 1 and said loop is being drawn up to the work, taking with it, as further shown in Figs. 19 22 and 25, the loop in thread 6 through which, in Figs. 16 and 19, the needles 1ᵃ and 2ᵃ are still engaged.

As shown in Figs. 18 and 19, the looper 6ᵃ has passed around to the right of needle 1ᵃ and is commencing to take another loop from the needle-thread 1, and the hook 6ᵇ of spreader 14 has finally released the loop in thread 6.

Figs. 21 and 22 show the looper farther advanced into the needle-thread loop, and the spreader 14 having reversed its movement, its hook 6ᵇ is about to engage thread 6 to spread the loop therein which looper 6ᵃ has projected through the loop in needle-thread 1.

Figs. 24 and 25 show the spreading of the loop in thread 6 as having commenced, the parts being just in advance of the position in which they are shown in Figs. 6 and 7. It will thus be understood that these movements of looper-thread 6 pass a loop thereof through a loop in needle-thread 1, and spread said loop to the right toward the middle of the seam (by the action of spreader 14) and to the left to the edge of the seam (by the lateral movement of the looper), so that it engages about the shanks of succeeding loops in both needle-threads 1 and 2, as shown in Figs. 2 and 4.

*Looper-thread 7.*—The different positions and movements of looper-thread 7 will next be traced through the several views—Figs. 5 to 25.

Referring to Figs. 6 and 7, the thread is seen to pass through guide-eye 195, along a groove and through two eyes in looper 7ᵃ, thence around hook-point 7ᵇ of spreader 14 and through a loop in needle-thread 2 (held by looper 7ᵃ) and upward to the work. Moving through the positions shown in Figs. 9 and 10, the parts reach the positions shown in Figs. 12 and 13 and the loop in thread 7 has been spread to such position that the descending needles 2ᵃ and 3ᵃ have passed therethrough. Continued movement of the parts causes the looper 7ᵃ to shed (with the assistance of shedder 15) its loop in needle-thread 2, as shown in Fig. 15, and the hook-point 7ᵇ to release its loop in looper-thread 7 (see Fig. 18) which loop is thereupon drawn up to the work by the needle-thread 2.

Fig. 18 shows the looper 7ᵃ as having moved around to the right of needle 2ᵃ and commencing to take another loop from the needle-thread 2. The hook-point 7ᵇ, moving from its position in Fig. 21, again engages thread 7 and coöperates with the lateral movement of the looper 7ᵃ to spread the loop of said thread which is now projected through the last loop taken from needle-thread 2, as shown in Figs. 24 and 6. It will thus be understood that these movements of looper-thread 7 pass a loop thereof through a loop in needle-thread 2, and spread said loop to the right across the middle of the seam (by the action of the spreader 14) and also to the left (by the lateral movement of the looper) so that it is engaged around the shanks of succeeding loops in both needle-threads 2 and 3, as shown in Figs. 2 and 4.

If the outer eye in looper 7ᵃ were in a position corresponding to the location of the outer eyes in the other loopers, and the needle 1ᵃ were of the same length as the other needles,—which conditions might if desired exist, with corresponding difference in the seam formed—then upon descent of the needles (to the position shown in Figs. 12 and 13, for example) the needle 1ᵃ would pass through the loop in thread 7. But by shortening the needle 1ᵃ and placing the outer eye in looper 7ᵃ closer to the inner eye, the loop in thread 7 is so spread (see Fig. 12) in relation to the movement of said needle, that the latter does not pass through the loop in thread 7.

*Looper-thread 8.*—The different positions and movements of looper-thread 8 will next be traced. In Fig. 6 this thread is seen to pass in a groove and through two eyes in looper 8ᵃ, thence upward around hook-point 7ᵇ and through a loop in needle-thread 3 (held by looper 8ᵃ) to the work. Moving through the positions shown in Figs. 9 and 10, the parts reach the positions shown in Figs. 12 and 13, and the loop in thread 8 has been spread to such position that the descending needles 3ᵃ and 2ᵃ have passed through said loop. Continued movement of the parts causes the looper 8ᵃ to shed (with the assistance of shedder 15) its loop in needle-thread 3, as shown in Fig. 15, and the hook-point 7ᵇ to release its loop in looper-thread 8 (see Fig. 18), which loop is thereupon drawn up to the work by the needle-thread 3.

Fig. 18 shows the looper 8ᵃ as having moved around to the right of needle 3ᵃ and commencing to take another loop from the needle-thread 3. The hook-point 7ᵇ, moving from its positions in Figs. 21 and 24, again engages thread 8, as shown in Fig. 6, and coöperates with the lateral movement of looper 8ᵃ to spread the loop thereof which is now projected through the last loop in needle-thread 3. It will thus be understood that these movements of looper-thread 8 pass a loop thereof through a loop in needle-thread 3 and spread said loop to the left across the middle of the seam (by the lateral movement of the looper) and to the right (by the action of spreader 14), so that it is engaged around the shanks of succeeding loops in both needle-threads 2 and 3, as shown in Figs. 2 and 4.

*Looper-thread 9.*—The different positions and movements of looper-thread 9 will next be traced. In Fig. 6 this thread is seen to pass in a groove and through two eyes in looper $9^a$, thence upward around the hook-point $9^b$ and through a loop in needle-thread 4 (held by looper $9^a$) to the work. Moving through the positions shown in Figs. 9 and 10, the parts reach the positions shown in Figs. 12 and 13 and the loop in thread 9 has been spread to such position that the descending needles $4^a$ and $3^a$ pass through said loop. Continued movement of the parts causes looper $9^a$ to shed (with the assistance of shedder 15) its loop in needle-thread 4, as shown in Fig. 15, and the hook-point $9^b$ to release its loop in looper-thread 9 (see Fig. 18), which loop is thereupon drawn up to the work by the needle-thread 4.

Fig. 18 shows the loops $9^a$ as having moved around to the right of needle $4^a$ and commencing to take another loop from the needle-thread 4. The hook-point $9^b$ moving from its position in Fig. 21 again engages thread 9, as shown in Fig. 24, coöperating with the lateral movement of looper $9^a$, to spread the loop of thread 9, which is now projected through the last loop in needle-thread 4. It will thus be understood that these movements of looper-thread 9 pass a loop thereof through a loop in needle-thread 4 and spread said loop to the left toward the middle of the seam (by the lateral movement of the looper) and to the right (by the action of spreader 14), so that it is engaged around the shanks of succeeding loops in both needle-threads 3 and 4, as shown in Figs. 2 and 4.

Following the movement of the feed-surface 20 through the several views Figs. 5 to 25, it will be seen that although the points of the teeth thereof rise above the level of the throat-plate and engage the work just as the needles are leaving the work, as shown in Fig. 22, movement of the work does not take place until the needles are clear of the work as shown in Figs. 25 and 7.

*Work-arm and frame of machine.*—The frame-work of the machine comprises a main standard 40 of the hollow-column or box type, a standard 41 of the ribbed column type, a bridge 42 rigidly connecting the standards, and a work-arm $40^b$. Bridge 42 is arched on its under edge (Figs. 30 and 32) and has a sectional form similar to that of channel-iron, the web being vertical with the edge flanges projecting rearward. The moving parts requiring lubricant are as far as practical inclosed or covered by hollow portions of the frame-work so formed that the lubricant or oil is prevented from flowing or leaking to the outer surfaces, but is drained into reservoirs from which it may be readily removed at convenient intervals.

Removable caps are provided where access to working parts is necessary for adjustment or repairs. Thus, cap $40^a$ (Figs. 30 and 31) forms a part of the front and top of standard 40; cap $41^a$ (same views) covers parts working in the top of standard 41; and cap $41^b$ (Figs. 30 and 31, removed in Figs. 40, 41, 42) covers an eccentric and its connections at the left-hand end of the machine.

Figure 31:
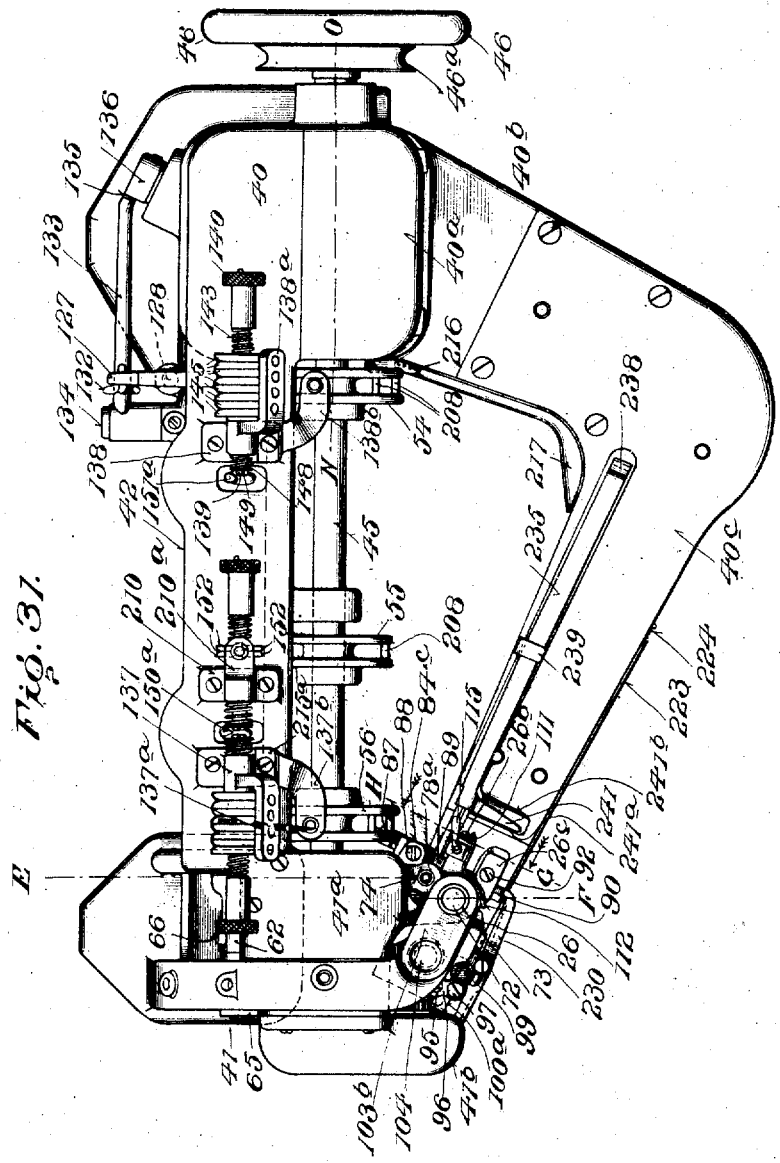

The hollow horizontal work-arm $40^b$ extends forward from an opening (Fig. 35) in the lower part of the front face of the standard 40, to an elbow from which the arm continues toward the left and rearward, its end terminating beneath an overhanging portion of the head of the machine, as shown in Fig. 34. Four screws 340 (see Figs. 32, 33 and 39) pass through horizontal openings in the wall of standard 40, and their threaded ends take into threaded sockets in the end of the work-arm, thereby rigidly securing the latter to the standard. The two parts of the arm form an angle of approximately ninety degrees at the elbow, and each part forms an angle of less than ninety degrees with reference to the main portion of the frame-work, as shown in Fig. 31. This outwardly bowed or elbowed work-arm is trough-like in cross-section, giving access to the parts operating therein upon removal of a cover $40^c$ (Fig. 31) as shown in Figs. 35 and 36.

In machines heretofore designed and commercially used for analogous work, it has been common to use a work-arm extending beneath and parallel to the bridge of the frame-work, the feed operating to advance the work onto the free end of and along said arm toward the end at which it is supported from one of the end standards of the machine. Therefore, in sewing up tubular work, such as stockings and the arms and legs of garments, for which such machines are especially designed, the work must accumulate on and about this arm until completed. Thereupon, in order to free and deliver the completed work from the machine, it is necessary to arrest its operation, elevate the presser-foot, needles, etc., cut or break the threads, and then pass the work, as gradually extended and flattened, back along the work-arm through the small space between the presser-foot above and the throat-plate, feed surface, etc., below—or in other words, the work must traverse in a reverse direction and with the machine stopped, the same path which it was caused to traverse by the feed of the machine during the formation of the seam. It is obvious that this operation of removing the work necessarily involves the double loss of consuming much of the operator's time and of putting the machine out of use for a material portion of each day's work. Furthermore, removal of the work in this way frequently so disturbs the positions of the several threads that the correct formation of stitches does not proceed immediately upon again starting the machine, and imperfect stitches are formed at the beginning of the new seam.

In the machine of the present invention, the losses and difficulties above referred to are obviated, as the feed operates to advance the completed work off the arm (i. e., longitudinally thereof and toward its free end). Furthermore, the peculiar shape and disposition of the work-arm affords the desirable conditions of having the feed advance the work away from the operator, and of affording ample space above the work-arm, unobstructed by other parts of the machine, so that the operator may easily manipulate and arrange the work on or about the work-arm, and may unobstructedly view the operation of the mechanism, without having to assume an uncomfortable position or reach around or behind other parts of the mechanism.

In operating the machine herein shown, the operator may preferably sit with her right side toward the machine in which position she will be able to look in the direction of the feed directly along its path and may readily handle the work in such manner as to rapidly present it to the feed mechanism. It is also of importance to note that the present machine makes by a single operation a complete seam, including the threads which cross the meeting edges of the two pieces of work joined.

Figs. 65, 66 and 67 show a somewhat modified form of the hollow work-arm embodying the characteristics and principles of construction above set forth. In this case the part 400 of the work-arm extends forward, from the upper part of the front face of the standard 40 at an angle of less than ninety degrees to the main portion of the framework, to an elbow at 401, and from the latter the part 402 depends in an approximately vertical direction to a second elbow 403. From the elbow 403, the approximately horizontal part 404 of the work-arm extends toward the left and rearward, (Fig. 66) and terminates beneath an overhanging portion of the head of the machine in substantially the same manner as the corresponding portion of the work-arm of Figs. 30 to 34. The open space 405 (Fig. 67) thus provided for the right arm of the operative affords still further freedom of movement in manipulating, arranging and advancing the work along the part 404 of the arm.

It is apparent that with the outwardly bowed or elbowed work-arm of Figs. 65-67, substantially the same internal mechanism, with the exception of obvious changes necessary to adapt it to the differences of shape, may be employed as in the case of the form of the work-arm shown in Figs. 30 to 34.

*Main driving connections.*—45 is the main-shaft; at its right hand end it carries the hand-wheel 46, having the usual grooved driving pulley 46$^a$ integral therewith, and fixed on the shaft by a set-screw 46$^b$ (Fig. 39). The hub of this combined wheel and pulley takes the end thrust of the shaft 45 against the end of bearing 48 in standard 40, and an oil flange 47 at the end of the hub sheds superfluous oil into the end of the bearing opening from which a groove 49 in the bearing conducts the oil through an opening 49$^a$, to the inside of standard 40 which constitutes one of the reservoirs in which superfluous lubricant may accumulate. Shaft 45 extends in front of bridge 42 (Fig. 30) and through standard 41, carrying at its projecting end an eccentric 60, referred to hereafter.

50 is a bevel gear secured to shaft 45 by set-screw 50$^a$ (Fig. 39), and meshing with a bevel gear 52 secured to vertical shaft 53 by set-screw 52$^a$. Ball-thrust bearing 51 surrounds shaft 45 between gear 50 and bearing 48.

118 is a combined bevel-gear and looper-eccentric secured by set-screw 118$^a$ to the lower end of shaft 53. The eccentric portion is numbered 167. Gears 52 and 118 are thus so placed that the end thrust on each will be balanced by the other, thus avoiding friction and the necessity of ball-thrust bearings or like anti-friction devices. The bearings for shaft 53 are plain bushings 120, 120, encircled and clamped by lugs or bracket arms 121, 121 split at their outer ends and adapted to be tightened against the bearings by screws 122, 122. Through connections explained hereafter, shaft 53 drives all of the moving parts operating below the throat-plate.

As best shown in Fig. 41 (Sheet 14), main-shaft 45 has thereon cross-thread-carrier eccentric 57 secured by set screw 57$^a$,—needle-bar eccentric 58 secured by set screw 58$^a$,—and a trimmer and cross-thread-hook eccentric 60 secured by set-screw 60$^a$, the names of these eccentrics indicating the parts which they operate through connections referred to hereafter, all of said parts operating above the throat-plate.

*Needle-bar and needles.*—Referring particularly to Figs. 30 and 38, 72 is the needle-bar movable vertically in bushing-bearings 73 and 74 secured in arms of the machine-frame. A short pitman 61 has at opposite ends capped bearings, one embracing eccentric 58 and the other embracing a pivot-stud 63, which latter is clamped in a split opening in a rock-arm 62, a screw 64 serving to contract said opening to grip the stud. At one end a screw 66 secures the rock-arm to a short shaft 65 (Figs. 40 and 41) free to rotate in bearings 67 and 68 in the frame. A link 69 connects the other end of arm 62 with the needle-bar. The link 69 (see Figs. 30 and 60, Sheet 7) has at its upper end a cylindrical cross-bar 69$^a$ bearing in a semi-cylindrical concave seat at the end of arm 62 and being embraced by a similar reversely concave seat in a cap 70 detachably secured to said arm by a screw 70$^a$. Both of these curved seats are notched to accommodate link 69 and permit necessary turning movement of bar 69$^a$ in its bearing. In case of wear of the cross-bar at the end of the link or of its curved seats, with consequent looseness in the connection, the cap 70 may be removed and the contacting surfaces of the cap and the end of arm 62, or either of them ground down to make the surface of the cylindrical bearing opening formed by said seats more closely fit the cross-bar of the link. A pivot-stud 71 (Figs. 41-42) screwed into a threaded opening through needle-bar 72, is embraced by the tubular cross-bar 69$^b$ at the lower end of link 69. From these explanations it will be apparent that eccentric 58 acts to vertically reciprocate the needle-bar. At its lower end the needle-bar 72 carries a needle clamp in which the needles 1$^a$, 2$^a$, 3$^a$ and 4$^a$ are secured (Figs. 38, 44, 45, 58). A flange 72$^a$ on this clamp has four thread-eyes through which the needle-threads pass to the eyes of the needles.

As clearly shown, the eyes of the four needles are disposed on a bias, or in other words, slightly oblique to the line of feed; this is important as it enables the loops of needle-threads to open wide without interference with an adjacent needle, and consequently makes it possible to place the needles very close together without impairing the functioning of the loopers in engaging the needle-thread loops. In a machine which has been successfully operated, the needles have been placed approximately one-sixteenth ($\frac{1}{16}''$) of an inch apart at their points, the other elements being positioned and proportioned accordingly.

*Cross-thread carrier.*—As already stated, cross-thread carrier 80 is fixed to the lower end of an oscillatory shaft 78. This shaft passes upward through a bearing-bushing 79 (Fig. 38) and above the latter carries a cylindrical head 78$^a$ secured by set-screw 78$^b$. A coiled spring 80$^a$ (Fig. 38) housed in the lower end of bushing 79, bears against a shoulder on shaft 78 and normally holds said shaft (and consequently the thread-carrier 80) in its lowermost position with the overhanging edge of head 78$^a$ in contact with the upper end of bushing 79.

77 is a short crank-arm projecting from one side of head 78$^a$, and 77$^a$ is a lip or flange (the function of which will be explained later) extending about half-way around said head at its other side. 76 is a spherical bearing, formed on a stud which is screwed into crank-arm 77, and engaged by the spherical opening of a bushing 75 (Figs. 40-41) which latter is clamped in a split opening in one end of a pitman 74, by tightening screw 74$^a$. At its other end said pitman has a capped bearing surrounding the spherical bearing surface of eccentric 57. Through the connections thus described, this eccentric imparts to the thread-carrier 80, the swinging oscillatory movements heretofore explained.

*Cross-thread hook 101.*—Hook 101 is secured to the lower end of a short vertical oscillatory shaft 99, journaled in a tubular bearing 100, which latter is cast integral with a plate 100$^a$ (Figs. 34, 43-46) which is secured by screws to a flattened surface on a lower arm 100$^b$ of the standard 41 of the frame.

98 is a short crank-arm secured by a set-screw to the upper end of shaft 99.

Spring 102 (Fig. 46) housed in the lower end of bearing 100 holds the shaft 99 and hook 101 normally lowered with crank-arm 98 in contact with the upper end of the bearing.

84 is the trimmer-sleeve oscillatory about the hollow presser-foot bar 85 which passes therethrough (Figs. 43 and 44).

84$^a$ is a crank-arm projecting from sleeve 84 (Figs. 34, 42-44) and connected to crank-arm 98 by a link 96; screw-studs 95 and 97 pivot the link to the respective arms.

84$^b$ (Figs. 30, 40, 41) is a crank-arm extending from the upper end of sleeve 84. A ball-stud 83 screwed into the outer end of arm 84$^b$ is engaged by a bushing 82 clamped in a split opening in the outer end of a pitman 81 by tightening a screw 81$^a$ (Figs. 40, 41, 42). At its other end said pitman has a capped bearing surrounding the eccentric 60, which through the connections just explained imparts to the hook 101 the swinging oscillatory movement heretofore described.

*Trimmer.*—The machine comprises trimmer-mechanism acting to trim two edges of fabric to be joined as the work is advanced to the needles. This trimmer consists of a fixed blade 90, and a reciprocatory blade 87. Blade 90, which is fixed to the presser-foot 26, has beveled edges, one engaging the undercut edge of a groove across the under face of the foot (Figs. 43, 44, 58), and the other beveled edge engaged by the beveled edge of a clamp block 91 secured by a screw 92. A yoke 86 secured to the lower end of an arm 84$^c$ forms an opening in which blade 87 is clamped by a set-screw 88 and shoe 89. Arm 84$^c$ is preferably cast integral with trimmer-sleeve or hollow trimmer-shaft 84 and extends downward and around to one side of the presser-foot, as clearly shown in Figs. 43-45 and 58. It will therefore be understood that the oscillation of sleeve 84 from eccentric 60, heretofore referred to in connection with the hook 101, also reciprocates blade 87 through arm 84ᶜ. The edges of blades 87 and 90 are oppositely beveled and sharpened as shown at 93, Fig. 52, and act as shears when the cutting edge of reciprocating blade 87 moves toward and over the cutting edge of fixed blade 90, thereby cutting straight and clean the upturned edges of the fabric which the feed of the machine intermittently draws in between the blades. The strips or bits of material removed by the trimmer-blades are directed to one side and out of the way by a deflector 111 referred to hereafter. After leaving the trimmer, and before they reach the needles, the trimmed edges are laid flat and into abutment with each other, as explained hereafter.

*Presser-foot and chaining-foot.*—85 is the hollow presser-foot bar, parallel to the needle-bar and behind the same when looking in the direction of feed. It is vertically movable in bearings 103 and 103ᵃ, through arms 103ᵇ and 100ᵇ respectively, on the standard 41 of the machine (see Fig. 42). A screw-threaded opening tapped into arm 103ᵇ above bearing 103, contains a spring 405 bearing against the upper end of the foot-bar and held under tension by a hollow adjusting nut 104 (Fig. 42). In the operation of the machine this spring yieldingly presses the foot against the work, permitting the foot to be slightly raised upon each upward and forward movement of the feed surface in advancing the work.

26 is the presser-foot having a hub 216 (Fig. 50) through which foot-bar 85 passes in the space above its lower bearing 103ᵃ and below the lower end of trimmer-sleeve 84 (Figs. 42, 44, 58). A set-screw 26ᵃ (Figs. 42 and 52) secures the foot to the bar. The presser-foot extends forward of its hub and downward toward the work-plate, and has a side strengthening web or rib 26ᵈ (Fig. 50) into which a headed stud 304 is screwed. Said stud passes loosely through and is movable in a vertical slot 305 in the fixed plate 100ᵃ, thereby guiding and holding the foot in its vertical movement when lifted to introduce work, and when lifted by upward movements of the feed surface. At its forward end the presser foot is notched or bifurcated forming two toes 26ᵇ and 26ᶜ (Fig. 52) separated by a space in which the upturned edges of work to be trimmed advance to the trimmer blades which latter overlie or project into said space (see Figs. 52 and 58). Trimmer blade 90 is secured in a groove in the underside of toe 26ᶜ, as already explained. Reciprocatory blade 87 works in a horizontal opening through toe 26ᵇ.

111 is a work-guide and deflector, which serves to direct and position the work as it approaches the trimmer blades, and by an extension 112 which reaches obliquely to the left (Fig. 58) over the toe 26ᶜ, deflects and discharges the trimmings, keeping them from being caught by the working parts about the needles. Guide 111 is secured to the vertical part of an angle-piece 113, the horizontal part of which movably fits in a transverse recess across the top of toe 26ᵇ. A screw-stud 114 (Fig. 53) passes through an opening in the end of a lever 115 (Fig. 54) through a slot (dotted lines Fig. 52) in angle-piece 113, and into a screw-threaded opening in toe 26ᵇ. A pin 116 projecting from the underside of lever 115 is movable in a short slot 117 in angle-piece 113. It follows when the screw-stud 114 is loosened the lever 115 may be turned about said stud to slide the angle-piece in its recess in toe 26ᵇ thereby adjusting the work-guide to the right or left. When the desired position of adjustment is reached, the screw-stud 114 is tightened to rigidly fix the parts. A tapering notch 94 (see Figs. 52 and 54) on the under surface of the presser-foot immediately behind the trimmer blades, acts upon the upturned trimmed edges of the work to lay them flat into abutment just in advance of the needles.

The chaining-foot or auxiliary presser-foot 25 is shown by itself in Fig. 51; in its relation to the other elements it is best shown in Figs. 50, 52, 7, 10, 13, 16, 19, 22, 25 and 27. This foot 25 fits and is vertically movable in a correspondingly shaped opening through presser-foot 26, a notch or recess 25ᵃ providing an opening through which the four needles pass in entering the work and through which the cross-thread 5 is looped back and forth across the seam. The vertical shank 25ᵇ of the chaining-foot has beveled edges and is movable in a dovetailed slide-way or groove 25ᶜ (Fig. 52) in the main presser-foot, said movement being limited by a stud 109 working in a slot 110 (Fig. 50). A spring 107, housed in an opening in the presser-foot, bearing at its lower end against the upper end of shank 25ᵇ and at its upper end against screw-plug 108, tends to move the chaining-foot to its lowermost position determined by pin 109 and slot 110. The chaining-foot is wide enough to cover the four lines of stitches with which latter it makes contact. The presence of the threads forming the stitches add thickness to the work along the line of the seam, this added thickness varying slightly with the different sizes of thread. By its yielding connection to the main presser-foot, the chaining-foot automatically accommodates itself to the difference of thickness without lifting the main presser-foot from contact with the work in front of the needles or at the sides of the seam, as clearly shown in Figs. 7-25. This results in distributing and equalizing the grip upon the work in feeding the same all about the point of operation of the needles, so that the feeding pull tends to advance the work uniformly and in a straight line at and about the point of formation of the stitches.

The satisfactory operation of a machine of this type requires that it shall be capable of "chaining-off", i. e., of forming the threads into stitches when there is no fabric under the presser-foot, as in passing the seam from one garment to another without stopping the machine or lifting the presser-foot. This operation is illustrated in Figs. 26 and 27, in connection with which it may be assumed that the threads are connected to a garment which has passed from beneath the presser-foot, the machine by its continued operation forming the "chain" shown. In the absence of any fabric, the feed-surface in making the feeding part of its movement makes direct contact with the under surface of presser-foot 26, while it grips the chain by pressing the latter against chaining-foot 25. When the next garment, for example, enters beneath the forward end of the presser-foot, the upward movement of the feed-surface lifts said foot higher than when no fabric is interposed between these parts. If the presser-foot and chaining-foot were rigidly fastened together (or in other words, if there was no chaining-foot), the latter foot would also be correspondingly lifted at this time, and so elevated that the feed-surface could not properly grip and feed the chain. This feed being essential, imperfect formation of stitches would be almost inevitable, and imperfectly formed stitches would likely appear at the beginning of the seam on the new garment. The mechanism might become so clogged with thread as to require stopping the machine. Such difficulties are, however, overcome by the yielding connection between the two feet, enabling the chaining-foot to remain in its lowered position (Fig. 27) in which it coöperates with the feed-surface to continue the feed of the chain while the next garment is entering beneath the presser-foot 26.

The means for lifting the presser-foot will be explained hereafter.

*Thread-guides, tensions, take-ups, etc., above throat-plate.*—Similar tension devices are used for the four needle-threads and the four looper-threads (see Figs. 30-32, 39, 39ᵃ, 40).

Referring particularly to Fig. 39, 138 is a bracket secured to the upper surface of the bridge 42 of the machine. 139 is a bar supported and longitudinally movable in a bearing opening through said bracket. A relatively strong spring 147 encircling bar 139 between bracket 138 and a washer 148, held by a pin 149, exerts yielding pressure tending to move bar 139 to the left. A pin 146 (Fig. 39) passing through bar 139 lies in a slot across the right hand face of bracket 138, and prevents rotation of the bar 139. A series of eight tension disks 145 are strung on bar 139, and pressed together by the action of a spring 143, which latter encircles the bar between washers 144 and 144ᵃ and is somewhat weaker than spring 147. The right-hand end of bar 139 is screw-threaded and split (Figs. 39 and 39ᵃ) and is engaged by an elongated thumb-nut 140 the inner end of which bears against washer 144ᵃ. The end of bar 139, at one side of the split, is cut-away or shortened, as shown in Fig. 39ᵃ, and at the other side forms radiating stop-surfaces 142, 142. A pin 141 projecting into the opening through nut 140, limits the turning of the latter by engaging one or the other of the stop surfaces 142, thereby varying the compression of spring 143 and consequently the pressure of the tension disks against each other and the strength of the tension upon the threads. In engaging the screw-threaded end of bar 139, nut 140 tends to compress together the parts separated by the slit; the resulting friction prevents accidental turning of the nut.

138ᵃ and 138ᵇ (Fig. 30) are two arms on bracket 138; the former has four thread eyes for the looper threads 6, 7, 8 and 9 respectively, while arm 138ᵇ has but one eye through which all the threads pass. Thread 6, for example, passes through its eye in arm 138ᵃ, around bar 139 between the convex surfaces of the two left-hand disks 145, through said eye in the opposite direction and then through eye 138ᵇ to the take-up 54, explained hereafter. The other threads 7, 8 and 9 follow similar paths between other disks 145. Or if it is found desirable to slightly increase the tension of any or all of the threads, they may in passing from the eyes in arm 138ᵃ to the eye in arm 138ᵇ, pass through the slots in arm 215 (Figs. 30, 33, 39). A similar arm 215ᵃ is better shown in Fig. 40. The bend thus formed in the threads and the resulting friction, increase the tension.

The construction of the tension device for needle-threads 1, 2, 3 and 4 is the same as described above except that bracket 137 is left-hand whereas 138 is right-hand. The needle-threads loop through the eyes in arm 137ᵃ around rods 139ᵃ and between the tension disks, and from an eye in arm 137ᵇ pass to a take-up 56. An arm 215ᵃ (Fig. 40) has slots through which the threads may pass to increase the tension in the manner explained as to similar arm 215.

The tension device for cross-thread 5 is similar in construction to the other tension devices except that the bracket 210 has only one arm 210ᵃ (Figs. 30, 31) and there are only two tension disks 152 (Fig. 40) on bar 150ᵃ. Thread 5 loops through an eye in arm 210ᵃ around bar 150ᵃ between the disks, and thence extends to take-up 55.

The take-ups 54, 55 and 56 (Figs. 30, 31, 39, 40, 41) are similar in construction and are all fixed on shaft 45. Take-up 54 for example (Fig. 39), consists of a disk or wheel, secured to shaft 45 by a set-screw 54ᵃ and having a deep peripheral groove across which one or more pins 208 extend. From the take-ups the threads pass through guide-eyes 209, 210 and 211, secured to the bridge 42 of the frame below the take-ups 54, 55 and 56 respectively (Figs. 30, 40, 41). The pins of the take-ups are so located with relation to their centers of rotation and the movement of the other elements of the machine, that they act in a well-known manner to take up slack thread at proper periods in the stitch-forming operation.

In addition to the rotary take-up 56, there is provided, for the needle-threads 1, 2, 3 and 4, a reciprocating take-up 212 (see Figs. 30, 38, 40 and 41). This take-up is in the form of a bent rod or wire, secured at its upper end to the needle-bar 72 by a screw 213 which latter engages a threaded opening in the end of stud 71 heretofore referred to (see Fig. 41.) The lower end of the take-up is in the form of a hook which engages about the needle-threads between the eye 209 and the thread-eyes in the flange 214 of the needle-clamp. As the needle-bar ascends to its highest position, take-up 212 acts to deflect the threads, as shown in Fig. 30, thereby coöperating with take-up 56, in taking up slack thread from the needle-thread loops below the work.

*Presser-foot lifting and tension-releasing means.*—Referring particularly to Figs. 32, 33, 38, 39, 41, and 61, 126 is a rock-shaft journaled at its ends in bearings in standards 40 and 41. 127 (Figs. 32, 33) is a rock-arm secured to shaft 126 by a set-screw and projecting rearward and resting on the upper end of a vertically movable lifter rod 128, which latter extends downward through a bearing in the flanged base of standard 40, to a knee-lifter device or treadle (not shown) by which the operative may lift the rod 128 to rock shaft 126. An arm 129 (Figs. 32, 38) set-screwed to the other end of shaft 126, is connected by link 130 to one arm of bell-crank-lever 131 fulcrumed on a stud 131ᵃ, the other arm of said lever reaching forward and engaging under a shoulder 84ᵈ of trimmer arm 84ᵉ (Figs. 38, 42 and 62). When the bell-crank-lever is actuated through these connections, it lifts the trimmer sleeve 84, which in turn acts through a spring washer 84ᵉ (Fig. 38) and a collar 84ᶠ set-screwed on presser-foot bar 85, to lift the latter and with it the presser-foot and parts mounted thereon, against the tension of presser-foot spring 405 (Fig. 42). A lip or flange 84ᵍ at the lower end of trimmer-sleeve 84 engages under a projecting lip 98ᵃ on the hub of crank arm 98 (Figs. 43 and 45), and thereby lifts hook-shaft 99 vertically in its bearings against spring 102 (Fig. 46), thus elevating hook 101. An arm 84ʰ (Figs. 30, 38, 40) at the upper end of sleeve 84, engages under lip 77ᵃ of the crank-arm 77, and thereby lifts shaft 78 and with it cross-thread carrier 80, against the tension of spring 80ᵃ (Fig. 38). It will thus be seen that through connections from the trimmer sleeve 84, the lifting of the latter elevates the presser-foot against its spring 105, the cross-thread carrier 80 against its spring 80ᵃ, and the cross-thread-hook 101 against its spring 102; and that when the operative releases the lifting means the tension of these springs will re-act to lower these parts at the same time rotating rock-shaft 126 to the position shown in Fig. 42.

When the operating parts above the throat-plate are lifted, as above explained, to permit removal of the work, where, for example, it is desired to terminate the seam back from the edge of the fabric or work, it is desirable to release the tensions to permit the threads to easily feed as the work is drawn out of the machine. This is accomplished by arms 150 and 151 secured on rock-shaft 126 (Figs. 30, 31, 32, 40 and 42) and extending upward through openings in the upper flange of the channel-iron bridge 45. When the operative rocks shaft 126 to lift the presser-foot and other parts, the beveled end 150ᵃ of arm 150 acts against the ends of bars 139ᵃ and 150ᵃ moving them longitudinally in their bearings against the tension of springs 117, and releasing the pressure between the tension disks and consequently their grip upon the threads 1, 2, 3, 4 and 5. In like manner the beveled end 151ᵃ of arm 151 acts against the end of bar 139 moving the same in its bearing against the tension of spring 147 and releasing the tension upon threads 6, 7, 8 and 9.

*Thread-cutter above work.*—For the purpose of cutting the needle-threads 1, 2, 3 and 4 and the cross-thread 5, when for example it is desired to terminate the seam and remove the work before the edge of the fabric or work is reached, a thread-cutter 230 is provided. It consists of a blade having cutting edges 230ᵃ, 230ᵃ (Figs. 43, 44, 56) secured to the lower end of a vertical stud 231 free to turn in sleeve or hub 232 which latter is a part of plate 100ᵃ (Fig. 58). At the outer ends of its cutting edges this thread-cutter is slightly hooked, so that when the needles, presser-foot and other parts are raised, and the cutter swung around in front of the needle and cross-threads, as shown in Fig. 56, said threads are gathered in by the acting cutting edge and pulled back under the end of chaining-foot 25 and over the work, thereby forming loops of these, threads around the cutting edge until the threads contact with fixed cutter blade 233 (Figs. 44 and 56), when the threads are sheared or cut off, leaving ends through the needles and cross-thread looper 80 of sufficient length to start the next seam.

*The feed, throat-plate, chaining fingers and loop-shedder.*—123, Figs. 35, 36 and 39, is the feed-shaft bearing in adjustably fixed bushings 154, 155. Bushing 154 receives the end thrust of bevel-gear 119 through the intermediate ball-thrust-bearing 156. Bevel-gear 119 is rotated by bevel-gear 118 with which it meshes, and a pin 124$^d$ on gear 119 engages a screw-stud 125 (Fig. 39) on feed-shaft 123 to rotate the latter. Another pin 124 projecting from gear 119 in the path of stud 125, limits the rotation of shaft 123 independent of gear 119 and consequently independent of the rotation of the main shaft 45. The object of this lost motion connection will be explained hereafter. Shaft 123 extends through bearing 155 and carries the eccentric 157 (Figs. 35—36), and the latter is embraced by a capped bearing 158 at the end of feed-lever or feed-bar 159. Lever 159 is hung at about its middle on a flat-spring fulcrum 160, one end of said spring being fastened to a lug 161 on the inner wall of work-arm 40$^b$ and the other end to a depending arm 162 on lever 159. The spring 160 allows the feed lever to swing forward and backward approximately on a radius equal to the length of the free spring. At its forward end the feed-lever is guided and confined at its sides by two parallel guide-bars 163, 163 secured by screws to the inside of the hollow work-arm; a recess or groove 164 (Figs. 36, 47, 48) extending longitudinally along this end of the feed-lever receives the foot 165 (Fig. 59) of the feed surface 20, a screw 165$^a$ passing through an elongated opening 165$^b$ securing the parts together and allowing limited adjustment. When in its elevated position the feed-surface extends forward and upward through the throat-plate 28, shown in Figs. 7, 22, 25, 27 and 36. The feed-surface proper is separated into five rows of teeth 20, 21, 22, 23, and 24, which work through slots 25$^a$, 21$^a$, 22$^a$, 23$^a$, 24$^a$, respectively, in the throat-plate 28 (Fig. 37) and leave an opening 20$^a$ (Fig. 59) through the feed-surface through which the needles operate. The rows of teeth 22 and 23 in front of the needles, and the rows of teeth 21 and 24 at the sides, press the work upward against the under surface of the presser-foot 26 in gripping and feeding the same, while the teeth 20 just back of the needle-opening press the work up against the chaining-foot 25, or in the case of "chaining off" feed the chain by gripping it against said foot.

The circular movement of the feed eccentric 157, is by virtue of the swinging spring fulcrum of the feed-lever 159 transformed into an elliptical motion in the toothed feed-surface, the major axis of the ellipse (see 166, Figs. 7, 10, 13, 16, 19, 22, 27) being vertical or slightly pitched in the direction of feed, or in a direction opposite thereto, as desired. This throws the greater portion of the forward movement of the feed surface teeth above the work-plate, at which time they act to feed the work, the needles being elevated clear of the work (see Figs. 7, 25).

From an examination of Figs. 7 to 27, it will be understood that when the needles are elevated free of the work, the teeth of the feed-surface, in the normal operation of the machine, project above the surface of the throat-plate. In order that the teeth of the feed-surface may not interfere with removal of the work (particularly when the seam is stopped back from the edge of the work) when the needles are up and the presser-foot lifted, means are provided whereby the feed-surface will be dropped below the surface of the throat-plate under these conditions. As will be seen this dropping of the feed-surface takes place simultaneously with the lifting of the presser-foot and release of the tensions. The outer end of lever-arm 127 on rock-shaft 126 (Figs. 31, 32, 35) is connected by a depending link 132, to a rock-arm 133 pivoted on a stud 134. Teeth 135 at the end of arm 133 are adapted to engage gear teeth on a sleeve 136 secured to the projecting end of feed-shaft 123.

In operation, when the machine is stopped with the needles up, and the operative lifts the presser-foot and releases the tensions, as already explained, the lifting of arm 127 will swing the arm 133 upward and its teeth 135 will engage the teeth of 136 (which are so located as to come to position to be thus engaged when the machine is stopped with the needles up) and slightly rotate the feed shaft 123 in the direction of the arrow Fig. 39, until the teeth 135 pass the teeth of 136, the stud 125 leaving its driving pin 124$^d$ on gear 119 as shown in Fig. 39. This limited independent rotation of the feed-shaft causes its eccentric 157 to rock feed lever 159 sufficient to drop the feed surface below the surface of the throat-plate. When the machine is again started, the feed shaft and feed remain stationary until pin 124$^d$ again overtakes stud 125; from which it results that the normal positioning and timing is not affected by this temporary lowering of the feed while the needles are up.

The throat-plate 28 fits in a flanged opening in upper surface of the outer end of the work-arm (Figs. 35, 45, 48, 49) and is secured by a screw 28ª (Fig. 48). Teeth 28ᵇ cut across the upper face of the throat-plate, extend from its forward end, in front of the needles, along the parts of the plate separated by the slots 21ª to 25ª beneath the presser foot (Figs. 26, 37, 48). The foot presses the work against these teeth when the feed-surface teeth are beneath the throat-plate, and thus securely holds the work against any backward pull by the operator in arranging the work and guiding it to the trimmer.

Teeth 28ᶜ cut across the under surface of the throat-plate (Fig. 48) over the foot 165 of the feed surface serve to remove dirt and lint that may deposit in the grooves separating the rows of teeth on the feed surface, thereby preventing such foreign matter from clogging and packing in said grooves and thereby interfering with the upward stroke of the feed surface.

16ª (Figs. 7, 10, 13, 16, 19, 22, 25, 26, 27, 48) is a chaining finger plate secured to the throat-plate across the front of the needle opening 19 (Fig. 26) through the latter. Three chaining fingers 16, 17 and 18 project forward from this plate and divide one end of the needle opening 19 into four spaces or parts into which the needles descend at the sides of the fingers (Fig. 26). The principal function of these chaining fingers is to take the place of the work or fabric, enabling the machine to properly form the stitches when running without any work under the needles, as illustrated in Figs. 26 and 27, in the operation of chaining off. As here shown the stitches are formed about the fingers, the formed stitches being advanced off of the free ends of the fingers by the feed of the chain. At the same time the presence of these fingers in no way interferes with the proper formation of stitches when work is under the needles, as illustrated in Figs. 7 to 25. In both cases the threads cross, on both sides of the seam, back and forth across the chaining-fingers in practically the same way, the only difference being that in "chaining off", the cross-thread 5 on the needle-side of the work bears directly upon the chaining-fingers instead of upon interposed fabric. Hence the threads may be accurately said to be passed across the chaining fingers whether or not fabric or work is interposed.

15 is a loop shedder (Figs. 7-27, 48, 49) in the form of a depending flange or lip secured to the under side of throat-plate 28 across the rear edge of the needle-opening. As shown, this shedder depends into the needle-opening 20ª of the feed-surface (Figs. 48 and 59) to the rear of the path of the needles, and between the side bars on which the rows of feed surface teeth 21 and 24 are formed. The function of the loop-shedder has already been explained in describing the operation of the stitch-forming elements.

*Loop-spreader.*—Loop-spreader 14, heretofore referred to in connection with Figs. 5-27, and more fully shown in Figs. 45, 47 to 49, is in the shape of a bell-crank lever, having at one end a fulcrum sleeve 204, embracing a headed pivot pin 202, which latter is seated at its lower end in a socket 202ª (Fig. 45) at the bottom of the hollow work-arm and secured by a screw 203. A ball stud 205 depending from the underside of the loop-spreader at the angle or bend thereof carries a bearing-bushing 206 having opposite flat sides, one contacting with the flattened end of feed-lever 159, and the other with the flattened surface of an angle-piece or cap 207, secured to the end of the feed-lever by a screw 207ª. The end of the feed-lever may thus slide up and down on the bushing 206 in its rising and falling movements, and the bushing may move transversely in the slot or recess at the end of the feed-lever as the spreader swings on the pivot pin 202, this combination of movements resulting in swinging the toothed end of the spreader back and forth transversely to the work-arm, said movement being indicated by the arrows in Figs. 5 to 27. While this loop-spreader (or equivalent means) coöperating with the loopers is essential in the formation of the seam shown in Figs. 1–4, it may be omitted and the lateral movement of the loopers relied upon to spread the loops in the looper-threads. With such omission the chain-side of the resulting seam might be the same as that illustrated in Fig. 2, except that the loops in looper-thread 8 would spread to the left (not to the right), similar to those in threads 6 and 7, and the loops in looper-thread 9 would not spread to the right around the shanks of loops in thread 3, but would simply pass around the shanks of loops in thread 4.

*Loopers and operating means therefor.*—Referring particularly to Figs. 47, 48, 49, 63 and 64. 177 is the looper-lever. 183 is a looper-carrier or block swiveled to turn (in the direction of the arrow Fig. 49) on a headed stud 184, which after passing through the carrier enters a socket in the end of lever 177 where it is secured by screw 185. Each of the loopers 6ª, 7ª, 8ª and 9ª has a thickened right-angle shank having two openings, the upper opening being slightly elongated. The four loopers with their thickened shanks in contact, are secured in a group between the upright side plates 191, 192 preferably integral with carrier 183. Two screws 193, 193ª pass through openings in plate 191, through the two openings in the shanks of the loopers and into threaded openings in plate 192. A deep slot 194 cut into carrier 183 where plate 191 joins it, renders the latter sufficiently yielding to enable the screws to tightly draw the parts together.

As shown in Figs. 47, 48, 64, each of the loopers has a thread-groove 196 extending along one side from its rear end to a thread-eye 197, and a short groove 196ª along its other side from eye 197 to a second thread-eye 198. In looper 7ª these thread-eyes are closer together than in the other loopers for the reason heretofore explained. Each looper is also notched or cut away at 196ᵇ; when the loopers are assembled these notches provide slots through which the threads may be readily positioned in the grooves 196 at the sides of the loopers. A plate 196ᶜ secured by the screws 193 and 193ª between the looper 9ª and plate 192, has a bent end serving to guide the looper-thread 9 into the groove 196 of looper 9ª. As clearly shown in Figs. 48 and 63, one edge of plate 191 is formed with four thread-eyes 195, through which the needle-threads are guided to the grooves 196 of the loopers respectively.

In Figs. 47, 48, 49, the loopers and their carrier are shown in their operative position. A flat spring 187 is secured at its upper end by a screw 187ª to the inner face of plate 186 which latter extends obliquely upward from the end of looper-lever 177. The lower free end of said spring is bent and engages a shoulder 188 on the looper-carrier to normally hold it in its operative position, the plate 192 contacting with the head of a screw 189, which latter engages an opening in plate 186. By varying the projecting length of this screw, the operative position of the loopers may be adjusted to one side or the other to insure proper positioning relative to the needles. The elongated upper openings (Fig. 64) in the looper shanks, through which screw 193 passes (Fig. 48) permits the loopers to be collectively or individually turned on screw 193, to afford the desired horizontal adjustment.

223 (Figs. 34, 47, 48, 49, 62) is a cover adapted to swing outward and downward on horizontal pivots 224, 225 at its ends (Figs. 30, 47), to uncover an opening 190 through the side of the work-arm adjacent to the loopers. A latch 226 (Fig. 30) retains this cover in its closed position. Through this opening the operative may observe the operation of the loopers and other parts within the end of the work-arm, and when the machine is stopped, may swing the looper-carrier outward on its swivel stud 184, in the direction of the arrow Fig. 49, bringing the end of spring 187 to bear against the flattened surface 188ª of the carrier (Figs. 49 and 63). In this position the loopers are accessible for threading, examination, removal or repairs.

The loopers are actuated from the looper-eccentric 167 (Figs. 35, 39) heretofore mentioned through the pitman 169 and looper-lever 177. Said eccentric is embraced by the capped end 168 of pitman 169. About midway of its length, pitman 169 slidingly bears against a flattened seat 170ª (Figs. 35, 36) in the work-arm. About this seat an oblong opening in the pitman is closed at one side by a cap 169ª; the length of the slot permits the pitman to move longitudinally on bearing blocks 171, 171 in said opening, said blocks embracing and being movable about a headed pivot-stud 170 secured at its lower end in a socket in seat 170ª. A washer 173 on the stud 170 beneath the head thereof, extends over the bearing blocks and over the upper surface of the pitman at the sides of the rectangular opening therein, and confines the parts in operative position. Through these connections the eccentric moves the pitman longitudinally, and at the same time rocks it about the fixed pivot stud 170. A headed pivot pin 176 is secured to the forward end of pitman 169, in the elbow of the work-arm, by a screw 175, passing through a cap 174 and the end of said pin. The headed end of this pin is embraced by the capped end 178 of the looper-lever 177. A flattened under-surface on lever 177 bears and is slidable against a flattened horizontal seat or surface 177ª at the bottom of the work-arm (Figs. 36 and 48).

181 is a headed pivot-stud fixed at its lower end in a socket through seat 177ª by a screw 181ª (Fig. 36), and embraced by a split bearing 180, consisting of two blocks (Figs. 35 and 47). An elongated rectangular opening through the looper-lever above seat 177ª, closed at one side by a cap 180ª secured by screws 180ᵇ (Figs. 47, 48, 36), embraces the bearing 180 beneath the head of pivot stud 181. From these connections it follows that the looper lever 177 may move longitudinally on and at the same time turn about pivot-stud 181 as a fulcrum, this combined movement being imparted to said lever from the pitman 169 through the connections explained, and resulting at the loopers in the elliptical movement indicated at 199 in Figs. 6 to 24 such elliptical movement combining a longitudinal movement of the loopers forward and backward with relation to the needles, and a side-shifting movement of the loopers relative to the needles and the line of feed.

While the loopers illustrated and described in detail each carry a looper-thread, it is to be understood that some or all of said loopers may be replaced by loopers which do not carry such threads with corresponding changes in the character of needle-stitches and seam produced.

*Loop-check and needle-guide.*—The part 27 (shown in front elevation in Figs. 7, 10, 13, 16, 19, 22 and 25, and in top plan in Figs. 12, 15 and 18—also shown in Figs. 47 and 48) has been designated a "loop-check." It has at its acting face four parallel vertical grooves, recesses or openings, each approximately semi-circular in cross-section. The needles descend into these grooves and are partly surrounded thereby, the proximity of the walls of the grooves being such as to open the loops in the needle-threads at the right-hand sides of the needles (see Fig. 15) and to direct said loops toward the approaching loopers so that the latter may with certainty and accuracy pass through said loops. In case any one or more of the needles has been deflected at its point in passing through the work, the deflected point coming into engagement with the wall of the corresponding needle groove above mentioned, will be guided to its normal position. The loop-check thus also serves as a needle-guide. This loop-check is supported by a bent arm 27$^a$ extending to the side wall of the work-arm (Fig. 47), where it is secured by a screw 200.

*Passage of looper-threads to the loopers.*—The path of these threads 6, 7, 8 and 9 has heretofore been traced to the thread-eye 209 (Fig. 30); from the latter they descend to four thread-eyes 216 (Figs. 31, 35) in a bar across the inside of a thread-guard 217, whence they pass horizontally along the inside of the guard to four more thread-eyes 219, and from the latter through four grooves or channels in the upper surface of a bar 220 which bridges the hollow work-arm in a diagonal direction directly beneath the work-arm cover 40$^c$ (Fig. 31) which is removed in Figs. 35, 36. From the ends of the grooves the threads pass through eyes 221 on the front vertical wall of the work-arm along a recess or channel 221$^a$ (Figs. 35, 47, 61) in said wall beneath cover 223, between separating and guiding pins 222 and through opening 190 to the thread-eyes 195 from which they pass to the loopers, as heretofore explained in describing the loopers.

*Thread-cutter for severing the threads below the work.*—As before stated in connection with the thread-cutter above the work, where the work must be removed without continuing the seam to the outer edge thereof; removal of the work is greatly facilitated by having the threads clipped or cut. To leave sufficient lengths of thread-ends through the loopers and needles so that they may be engaged by the feed and advanced just as though a piece of fabric were under the presser-foot, it is desirable that the thread-cutter shall operate to pull off sufficient thread and clip the threads at points to leave the desired length of thread-ends.

We have already seen that the upper thread-cutter 230 cuts the needle-threads and the cross-thread 5 in such manner as to leave ends thereof extending from the needles back under the chaining-foot. The lower thread-cutter about to be explained, acts in a similar manner with reference to the looper-threads 6, 7, 8 and 9. This lower thread-cutter (Figs. 30, 31, 32, 36, 37, 57) consists of a bar 235 bent at one end to form a finger grip 238, and at the other end having a right-angle blade 241 having a shearing edge 241$^a$ (Fig. 48) and a sleeve 236 through which latter a horizontal rod 237 passes (Figs. 37, 57). This thread-cutter bar 235 is longitudinally movable in a groove or depression in the top of cover 40$^c$ (Fig. 31) and is guided by said groove and by its engagement with rod 237. When not in use the blade takes the position shown in Figs. 31 and 48, and lies in a transverse recess or depression 241$^b$ in cover 40$^c$ being held in this position by spring 239 (Fig. 31). When the operative pushes the thread-cutter forward, the blade 241 rides up the inclined surface 242 (Fig. 48) at the front of recess 241$^b$ and advances along the surface of the throat-plate beneath the work, gathering in front of it the threads extending downward from the work and pulling off lengths of the threads sufficient to form loops around the edge of blade 241, as shown in Fig. 57. In said figure I have shown the blade 241 as thus pulling off loops in the four looper threads, 6, 7, 8 and 9 only; but as the blade 241 will in its advance also encounter the four needle threads, each extending downward from the work in a loop around its corresponding looper and upward through the work to the eye of the needle, it follows that the blade will also pull off lengths of the needle-threads sufficient to form loops (illustration of which in the drawings would involve much confusion) around the edge thereof.

When the blade 241 reaches the rear end of the throat-plate, the pressure of spring 239 (Figs. 31, 57) causes said blade to drop into a transverse recess 243 (Figs. 36, 37, 48, 57) in which position its further movement causes its cutting edge to act against the cutting edge of a blade 244 fixed by screws 245, thereby severing all of the threads which are gathered up by the blade 241, or in other words, all threads extending from the underside of the work. The ends of looper-threads 6, 7, 8 and 9 thus severed would extend upward from the loopers through the thread-plate and along the latter beneath the presser-foot. The thus severed ends of the needle-threads 1, 2, 3 and 4 would extend from the needle-eyes downward through the work and along the throat-plate beneath the presser-foot. Hence if this thread-cutter be alone relied upon to cut the needle-threads, withdrawal of the work will cause the ends of said threads to be drawn through the work.

Parts of the mechanism herein described and illustrated have been made the subjects-matter of divisional applications Sr. Nos. 379,653, 379,654, and 379,655, filed June 18th, 1907, in the name of Christina P. Borton, administratrix of the estate of Stockton Borton, deceased.

What I claim is:—

1. The combination with a gang of two or more needles, of a cross-thread carrier having a thread-guiding blade thereon adapted to be projected between two of the needles by the movement of the carrier.

2. The combination with a gang of two or more needles, of a cross-thread carrier movable toward and from the needles and having thereon a thread-guiding blade adapted to be projected beyond the needles by the movement of the carrier toward the needles.

3. In a sewing machine, the combination with stitch-forming mechanism, of a cross-thread carrier having at one end a thread-eye; an oscillatory shaft to which the other end of the thread-carrier is secured; and a thread-guiding blade projecting from the thread-carrier intermediate of its ends.

4. In a sewing machine, the combination with stitch-forming mechanism, of a cross-thread carrier having thereon a thread-guiding blade; and a coöperating hook adapted to intermittently engage the cross-thread and extend the same in a path leading from the point of attachment of said thread to the seam around the hook and across the blade to an eye in the thread-carrier.

5. In a sewing machine, the combination of a main driving shaft; a presser-foot bar; a sleeve or tubular shaft rotatable about said bar; a cross-thread carrier; a cross-thread hook; two upright rotatable shafts to which said carrier and hook are respectively secured; driving connections from the main shaft to said tubular shaft and from the latter to one of said upright shafts; and driving connections to the other upright shaft.

6. The combination of a rotatable sleeve or tubular shaft; a presser-foot bar about which said shaft is rotatable; trimmer-mechanism; an arm extending from said tubular shaft and connected to a movable blade of the trimmer-mechanism which is actuated thereby; another arm extending from said tubular shaft; driving connections operating through said last-mentioned arm to impart rotary movement to the tubular shaft; a cross-thread manipulating element; and connections from said tubular shaft to said element for driving the latter.

7. The combination with a throat-plate, of two or more chaining-fingers projecting into a needle-opening through said throat-plate; three or more needles and driving connections therefor said needles in their operation respectively entering said needle-opening in the spaces separated by said fingers; means acting during the operation of the needles to pass a stitch-forming thread of stitches formed by one of said needles back and forth across one of said chaining-fingers into engagement with stitches formed by another of the three needles; and means also acting during the operation of the needles to pass another stitch-forming thread of stitches formed by another of said needles back and forth across another chaining-finger into engagement with stitches formed by another needle.

8. The combination with a throat-plate, of three chaining-fingers projecting into a needle-opening through said throat-plate; four needles and driving connections therefor said needles in their operation respectively entering said needle-opening in the spaces separated by said fingers; and means acting during the operation of the needles to pass a different stitch-forming thread back and forth across each of said chaining-fingers from stitches formed at one side thereof into engagement with stitches formed at the other side thereof.

9. The combination with a throat-plate, of three chaining-fingers projecting into a needle-opening through said throat-plate; four needles and driving connections therefor said needles in their operation respectively entering said needle-opening in the spaces separated by said fingers; and means acting during the operation of the needles to pass a stitch-forming thread of stitches formed by each needle back and forth across an adjacent chaining-finger into engagement with stitches formed at the opposite side of said finger.

10. The combination with a throat-plate, of two or more chaining-fingers projecting into a needle-opening through said throat-plate; three or more needles and driving connections therefor, said needles in their operation respectively entering said needle-opening in the spaces separated by said fingers; means acting during the operation of the needles to pass a cross-thread back and forth across said fingers and into engagement with stitches formed by the needles; means acting during the operation of the needles to pass a stitch-forming thread of stitches formed by one of said needles back and forth across one of said chaining-fingers into engagement with stitches formed by another of the three needles; and means also acting during the operation of the needles to pass another stitch-forming thread of stitches formed by another of said needles back and forth across another chaining-finger into engagement with stitches formed by another needle.

11. The combination with four needles and driving mechanism therefor, of means coöperating therewith to project loops of stitch-forming thread through loops of thread projected by each needle from one side of the seam and to extend said loops of stitch-forming thread laterally across the seam into position for another needle to form stitches therethrough.

12. The combination with four needles and driving mechanism therefor, of means coöperating therewith to project loops of stitch-forming thread through loops of thread projected by each needle from one side of the seam and to spread each of said loops of stitch-forming thread into such position that two of the needles enter said loop at the next stitch-forming operation and form stitches therethrough.

13. The combination with two needles and driving mechanism therefor, of a looper, and driving means operating said looper to impart thereto longitudinal loop-taking movements at the outer or far side of one needle and side shifting movements to a position to the outer or far side of the other needle.

14. The combination with two needles and driving mechanism therefor, of a looper, a looper lever carrying the looper, and driving means actuating said lever longitudinally and rotatively on its fulcrum and thereby imparting to the looper longitudinal loop-taking movements at the outer or far side of one needle and side shifting movements to a position to the outer or far side of the other needle.

15. The combination with three needles and driving mechanism therefor, of a looper; and driving means operating said looper to impart thereto loop-taking movements at one side of one needle and lateral movements to a position between the paths of the other needles.

16. The combination with three needles and driving mechanism therefor, of two loopers; and driving mechanism operating said loopers to impart thereto loop-taking movements at one side of their respective needles and lateral movements shifting the looper for one outside needle to a position between the paths of the other two needles and correspondingly shifting the other looper.

17. The combination with four needles and driving mechanism therefor, of four loopers; and driving mechanism operating said loopers to impart thereto loop-taking movements at one side of their respective needles and lateral movements shifting the looper for one outside needle to a position between the paths of two other needles and correspondingly shifting the other loopers.

18. The combination of a throat plate; three needles and driving mechanism therefor; a looper; and driving means operating said looper to impart thereto loop-taking movements at one side of one needle and lateral movements to a position between the paths of the other needles, said loop-taking and lateral movements being in a plane approximately parallel to the throat-plate of the machine.

19. The combination of a throat plate; three needles and driving mechanism therefor; two loopers; and driving mechanism operating said loopers to impart thereto loop-taking movements at one side of their respective needles and lateral movements shifting the looper for one outside needle to a position between the paths of the other two needles and correspondingly shifting the other looper, said loop-taking and lateral movements being in a plane approximately parallel to the throat-plate of the machine.

20. The combination of a hollow elbowed work-arm free at one end and supported from its other end which joins the main frame-work or casing of the machine; a looper-lever extending within said arm from the free end thereof to an elbow therein; a fulcrum in said arm for said looper-lever on which the latter is oscillatory in a lateral direction and movable longitudinally; driving connections extending within said arm from the supporting end thereof to the end of the looper-lever at said elbow in the work-arm; and one or more loopers carried by the looper-lever at the free end of the work-arm.

21. The combination with one or more loopers and means for imparting thereto loop-taking and releasing or shedding movements approximately parallel to the line of feed, of a loop-shedder coöperating with said looper or loopers.

22. The combination with a throat-plate, of one or more loopers and means for imparting thereto loop-taking and releasing or shedding movements approximately parallel to the line of feed; and a loop-shedder extending across the space between said looper or loopers and the throat-plate and transverse to the line of feed.

23. The combination with a throat-plate of one or more loopers and means for imparting thereto loop-taking and releasing or shedding movements approximately parallel to the line of feed; and a loop-shedder in the form of a lip or flange on the throat-plate projecting into the space between the latter and the looper or loopers.

24. The combination with a throat-plate, of one or more loopers and means for imparting thereto loop-taking and releasing or shedding movements approximately parallel to the line of feed; of a feed-surface and driving connections therefor; and a loop-shedder in the form of a lip or flange on the throat-plate projecting into an opening through the feed-surface and into the space between the throat-plate and the looper or loopers.

25. The combination with a plurality of needles and driving mechanism therefor, of means including two loopers and a loop-spreader adapted to project loops of stitch-forming thread through loops of thread projected by each of two needles from one side of the seam and to extend said first-named loops of stitch-forming thread laterally across the seam into position for another needle to form stitches therethrough; and driving connections for said parts.

26. The combination with two needles and driving mechanism therefor, of means including two loopers and a loop-spreader adapted to project loops of stitch-forming thread through loops of thread projected by each needle from one side of the seam and to extend said first-named loops of stitch-forming thread each laterally across the seam into position for the other needle to form stitches therethrough; and driving connections for said parts.

27. The combination with a plurality of needles and driving mechanism therefor, of means coöperating therewith to project loops of stitch-forming thread through loops of thread projected by each of two needles from one face of the seam; and a loop-spreader adapted by its movement to spread said first-named loops of stitch-forming thread laterally each into position for two needles to form stitches therethrough in said same face of the seam; and driving connections for said loop-spreader.

28. The combination with a plurality of needles and driving mechanism therefor, of means including two loopers and a loop-spreader adapted to project loops of stitch-forming thread through loops of thread projected by each of two needles from one side of the seam and to spread said loops of stitch-forming thread laterally across the seam each into position for two needles to form stitches therethrough; and driving connections for said parts.

29. The combination with two needles and driving mechanism therefor, of means including two loopers and a loop-spreader adapted to project loops of stitch-forming thread through loops of thread projected by each needle from one side of the seam and to spread said loops of stitch-forming thread laterally across the seam into position for both needles to form stitches therethrough; and driving connections for said parts.

30. The combination with four needles and driving mechanism therefor, of four loopers and a loop-spreader adapted to project loops of stitch-forming thread through loops of thread projected by each needle from one side of the seam and to spread said loops laterally across the seam each into position for two needles to form stitches therethrough; and driving connections for said parts.

31. The combination of two or more needles and driving mechanism therefor; a throat-plate; one or more loopers and driving connections for operating the same in a plane approximately parallel to the throat-plate on an axis approximately perpendicular to said throat-plate; and a loop-spreader and driving connections for moving the same in a plane approximately parallel to the throat-plate on an axis approximately perpendicular to said throat-plate.

In testimony whereof I have signed this specification in the presence of two subscribing witnesses.

STOCKTON BORTON.

Witnesses:
J. WESLEY BINNING.
ROBT. E. LEWIS.

It is hereby certified that in Letters Patent No. 1,041,574, granted October 15, 1912, upon the application of Stockton Borton, of Providence, Rhode Island, for an improvement in "Sewing-Machines," errors appear in the printed specification requiring correction as follows: Page 6, line 22, for the word "loops" read *looper;* page 8, line 3, for the word "The" read *This;* page 10, line 43, after the word "might" insert the word *even;* page 14, line 78, for the word "About" read *Above;* and that the said Letters Patent should be read with these corrections therein that the same may conform to the record of the case in the Patent Office.

Signed and sealed this 26th day of November, A. D., 1912.

[SEAL.]

C. C. BILLINGS.

shedding movements approximately parallel to the line of feed; and a loop-shedder in the form of a lip or flange on the throat-plate projecting into the space between the latter and the looper or loopers.

24. The combination with a throat-plate, of one or more loopers and means for imparting thereto loop-taking and releasing or shedding movements approximately parallel to the line of feed; of a feed-surface and driving connections therefor; and a loop-shedder in the form of a lip or flange on the throat-plate projecting into an opening through the feed-surface and into the space between the throat-plate and the looper or loopers.

25. The combination with a plurality of needles and driving mechanism therefor, of means including two loopers and a loop-spreader adapted to project loops of stitch-forming thread through loops of thread projected by each of two needles from one side of the seam and to extend said first-named loops of stitch-forming thread laterally across the seam into position for another needle to form stitches therethrough; and driving connections for said parts.

26. The combination with two needles and driving mechanism therefor, of means including two loopers and a loop-spreader adapted to project loops of stitch-forming thread through loops of thread projected by each needle from one side of the seam and to extend said first-named loops of stitch-forming thread each laterally across the seam into position for the other needle to form stitches therethrough; and driving connections for said parts.

27. The combination with a plurality of needles and driving mechanism therefor, of means coöperating therewith to project loops of stitch-forming thread through loops of thread projected by each of two needles from one face of the seam; and a loop-spreader adapted by its movement to spread said first-named loops of stitch-forming thread laterally each into position for two needles to form stitches therethrough in said same face of the seam; and driving connections for said loop-spreader.

28. The combination with a plurality of needles and driving mechanism therefor, of means including two loopers and a loop-spreader adapted to project loops of stitch-forming thread through loops of thread projected by each of two needles from one side of the seam and to spread said loops of stitch-forming thread laterally across the seam each into position for two needles to form stitches therethrough; and driving connections for said parts.

29. The combination with two needles and driving mechanism therefor, of means including two loopers and a loop-spreader adapted to project loops of stitch-forming thread through loops of thread projected by each needle from one side of the seam and to spread said loops of stitch-forming thread laterally across the seam into position for both needles to form stitches therethrough; and driving connections for said parts.

30. The combination with four needles and driving mechanism therefor, of four loopers and a loop-spreader adapted to project loops of stitch-forming thread through loops of thread projected by each needle from one side of the seam and to spread said loops laterally across the seam each into position for two needles to form stitches therethrough; and driving connections for said parts.

31. The combination of two or more needles and driving mechanism therefor; a throat-plate; one or more loopers and driving connections for operating the same in a plane approximately parallel to the throat-plate on an axis approximately perpendicular to said throat-plate; and a loop-spreader and driving connections for moving the same in a plane approximately parallel to the throat-plate on an axis approximately perpendicular to said throat-plate.

In testimony whereof I have signed this specification in the presence of two subscribing witnesses.

STOCKTON BORTON.

Witnesses:
J. WESLEY BINNING.
ROBT. E. LEWIS.

It is hereby certified that in Letters Patent No. 1,041,574, granted October 15, 1912, upon the application of Stockton Borton, of Providence, Rhode Island, for an improvement in "Sewing-Machines," errors appear in the printed specification requiring correction as follows: Page 6, line 22, for the word "loops" read *looper;* page 8, line 3, for the word "The" read *This;* page 10, line 43, after the word "might" insert the word *even;* page 14, line 78, for the word "About" read *Above;* and that the said Letters Patent should be read with these corrections therein that the same may conform to the record of the case in the Patent Office.

Signed and sealed this 26th day of November, A. D., 1912.

[SEAL.]

C. C. BILLINGS.

It is hereby certified that in Letters Patent No. 1,041,574, granted October 15, 1912, upon the application of Stockton Borton, of Providence, Rhode Island, for an improvement in "Sewing-Machines," errors appear in the printed specification requiring correction as follows: Page 6, line 22, for the word "loops" read *looper;* page 8, line 3, for the word "The" read *This;* page 10, line 43, after the word "might" insert the word *even;* page 14, line 78, for the word "About" read *Above;* and that the said Letters Patent should be read with these corrections therein that the same may conform to the record of the case in the Patent Office.

Signed and sealed this 26th day of November, A. D., 1912.

[SEAL.]                                C. C. BILLINGS.